US012627997B2

(12) United States Patent
Yang et al.

(10) Patent No.: US 12,627,997 B2
(45) **Date of Patent: *May 12, 2026**

(54) SYSTEMS AND METHODS FOR SIMULATING WIRELESS INTERFERENCE IN A WIRED TELECOMMUNICATIONS NETWORK

(71) Applicant: Verizon Patent and Licensing Inc., Basking Ridge, NJ (US)

(72) Inventors: Xiong Yang, Berkeley Heights, NJ (US); Mourad B. Takla, Hillsborough, NJ (US); Matthijs Andries Visser, Randolph, NJ (US); Chokri Trabelsi, Bridgewater, NJ (US); Sankrith Subramanian, St. Petersburg, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 386 days.

This patent is subject to a terminal disclaimer.

(21) Appl. No.: 18/220,193

(22) Filed: Jul. 10, 2023

(65) Prior Publication Data

US 2023/0354054 A1     Nov. 2, 2023

Related U.S. Application Data

(63) Continuation of application No. 17/464,860, filed on Sep. 2, 2021, now Pat. No. 11,711,701.

(51) Int. Cl.
*H04W 16/22*          (2009.01)
(52) U.S. Cl.
CPC ................................. *H04W 16/22* (2013.01)

(58) Field of Classification Search
CPC .............. H04B 17/345; H04B 17/3912; H04B 17/347; H04W 24/06
See application file for complete search history.

(56) References Cited

U.S. PATENT DOCUMENTS

| | | | |
|---|---|---|---|
| 7,647,053 B2 | 1/2010 | Pitchers | |
| 7,925,295 B2 * | 4/2011 | Yanover | H04W 52/04 |
| | | | 455/524 |
| 8,995,930 B2 | 3/2015 | Lim | |
| 9,198,185 B2 * | 11/2015 | Kovacs | H04B 1/707 |
| 9,491,714 B2 | 11/2016 | Sun et al. | |
| 2013/0039205 A1 * | 2/2013 | Murakami | H04W 72/541 |
| | | | 370/252 |
| 2014/0087668 A1 * | 3/2014 | Mow | H04W 24/08 |
| | | | 455/67.14 |
| 2023/0035449 A1 * | 2/2023 | Ryu | H04B 7/088 |

* cited by examiner

*Primary Examiner* — Rasheed Gidado

(57)          ABSTRACT

One or more computing devices, systems, and/or methods are provided. In an example, a method includes instantiating a first user equipment (UE) module on a first computing device and instantiating a second UE module on a second computing device connected to the first computing device by a wired network. A first base station (BS) module associated with the first UE module is instantiated on a third computing device coupled to the wired network and a second BS module associated with the second UE module is instantiated on a fourth computing device coupled to the wired network. A first resource allocation map is sent from the first BS module to the second BS module. An interference metric is generated based on the first resource allocation map. A data transmission between the second UE module and the second BS module is modulated based on the interference metric.

20 Claims, 12 Drawing Sheets

100

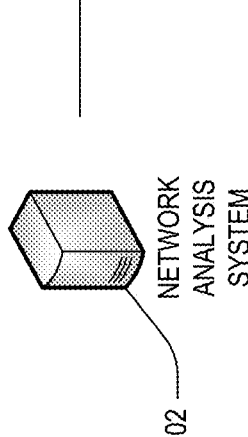

102 — NETWORK ANALYSIS SYSTEM

PROVIDE SIMULATION RESULTS

CAUSE A MODIFICATION TO THE NETWORK TO ADJUST CHANNEL CONDITIONS

GENERATE AND SEND A NOTIFICATION TO A SERVICE REPRESENTATIVE TO SERVICE ONE OR MORE BASE STATIONS OF THE WIRELESS COMMUNICATION NETWORK

CAUSE AN AUTONOMOUS VEHICLE TO BE DISPATCHED TO ADDRESS AN ISSUE WITH THE WIRELESS COMMUNICATION NETWORK

Fig. 1C

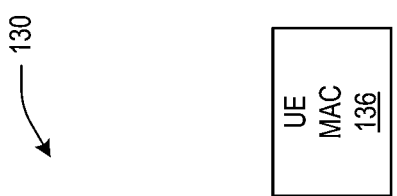
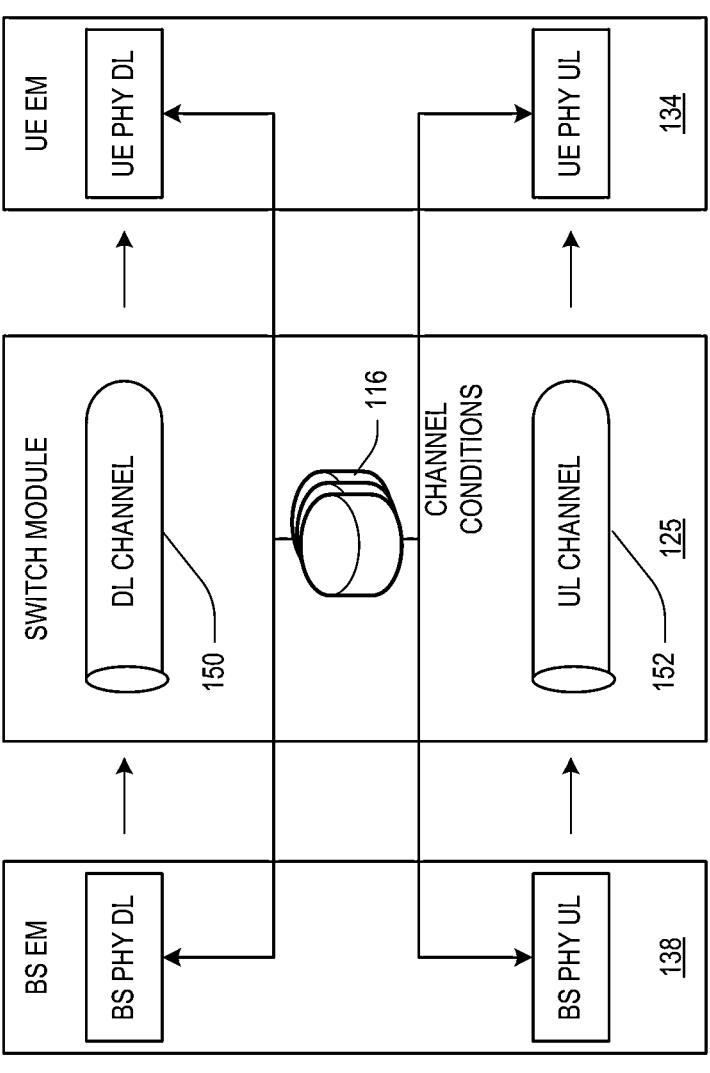
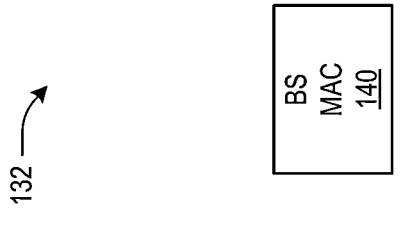
Fig. 1D

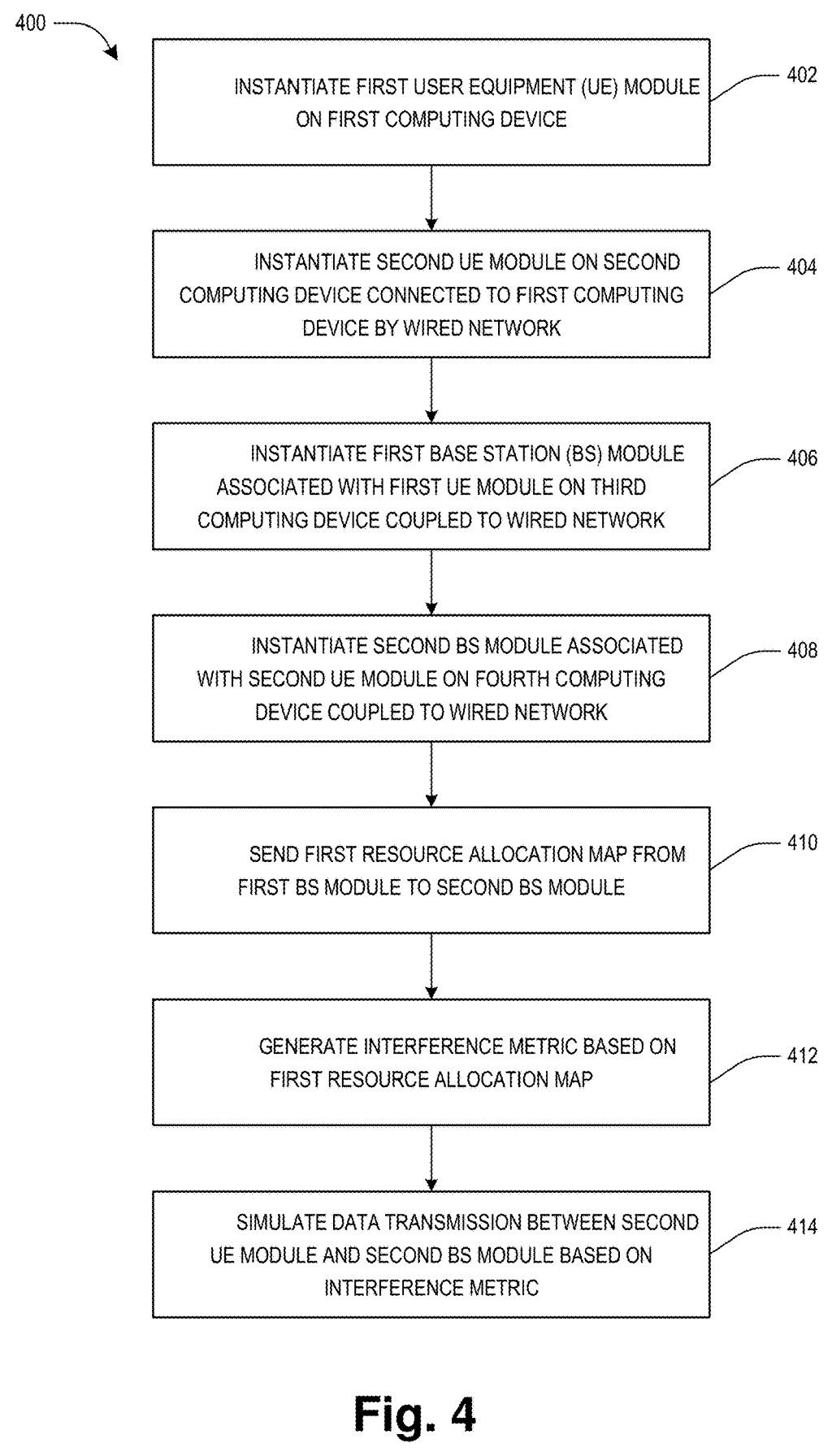

400

| INSTANTIATE FIRST USER EQUIPMENT (UE) MODULE ON FIRST COMPUTING DEVICE | — 402 |

| INSTANTIATE SECOND UE MODULE ON SECOND COMPUTING DEVICE CONNECTED TO FIRST COMPUTING DEVICE BY WIRED NETWORK | — 404 |

| INSTANTIATE FIRST BASE STATION (BS) MODULE ASSOCIATED WITH FIRST UE MODULE ON THIRD COMPUTING DEVICE COUPLED TO WIRED NETWORK | — 406 |

| INSTANTIATE SECOND BS MODULE ASSOCIATED WITH SECOND UE MODULE ON FOURTH COMPUTING DEVICE COUPLED TO WIRED NETWORK | — 408 |

| SEND FIRST RESOURCE ALLOCATION MAP FROM FIRST BS MODULE TO SECOND BS MODULE | — 410 |

| GENERATE INTERFERENCE METRIC BASED ON FIRST RESOURCE ALLOCATION MAP | — 412 |

| SIMULATE DATA TRANSMISSION BETWEEN SECOND UE MODULE AND SECOND BS MODULE BASED ON INTERFERENCE METRIC | — 414 |

Fig. 4

SYSTEMS AND METHODS FOR SIMULATING WIRELESS INTERFERENCE IN A WIRED TELECOMMUNICATIONS NETWORK

RELATED APPLICATION

This application claims priority to and is a continuation of U.S. application Ser. No. 17/464,860, filed on Sep. 2, 2021, entitled "SYSTEMS AND METHODS FOR SIMULATING WIRELESS INTERFERENCE IN A WIRED TELECOM-MUNICATIONS NETWORK", which is incorporated by reference herein in its entirety.

BACKGROUND

A wireless telecommunication network provides various telecommunication services such as telephony, video, data, messaging, and/or broadcasts. The wireless telecommunica-tion network may include a number of base stations (e.g., a Node B, a gNB, an access point (AP), a radio head, a transmit receive point (TRP), a New Radio (NR) BS, a 5G Node B, and/or the like) that can support communication for a number of user equipment (UEs). A user equipment (UE) may communicate with a base station via a downlink and an uplink. The downlink (or forward link) refers to the com-munication link from the base station to the UE, and the uplink (or reverse link) refers to the communication link from the UE to the base station.

BRIEF DESCRIPTION OF THE DRAWINGS

While the techniques presented herein may be embodied in alternative forms, the particular embodiments illustrated in the drawings are only a few examples that are supple-mental of the description provided herein. These embodi-ments are not to be interpreted in a limiting manner, such as limiting the claims appended hereto.

FIGS. 1A-1D are diagrams of one or more example implementations 100, according to some embodiments.

FIG. 4 is a flow chart illustrating an example method for estimating interference in a wireless telecommunication network, according to some embodiments.

DETAILED DESCRIPTION OF EXAMPLE EMBODIMENTS

Figure 1A:
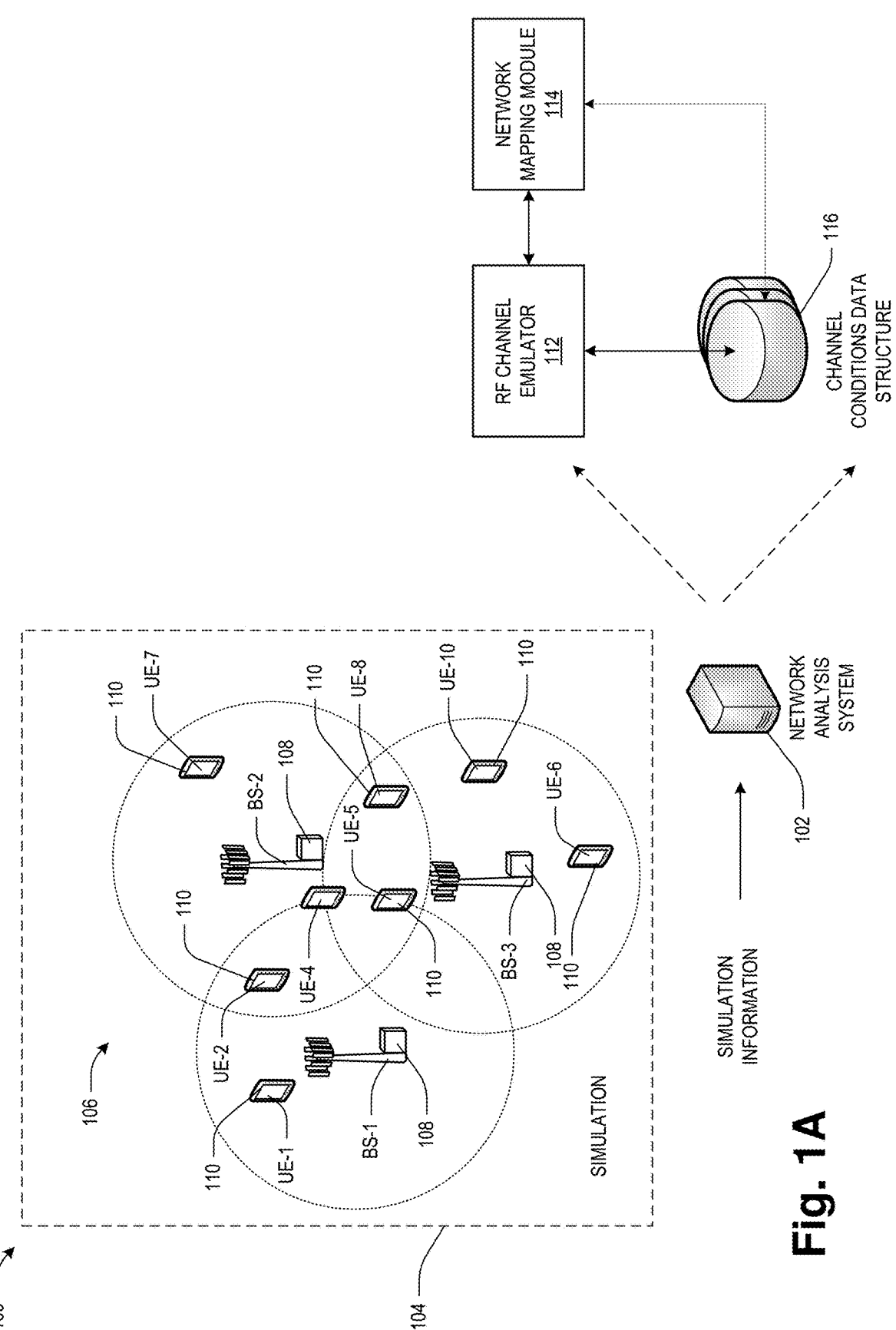

Subject matter will now be described more fully herein-after with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, com-ponents, and/or systems. Accordingly, this subject matter is not intended to be construed as limited to any example embodiments set forth herein. Rather, example embodi-ments are provided merely to be illustrative. Such embodi-ments may, for example, take the form of hardware, soft-ware, firmware or any combination thereof.

The following provides a discussion of some types of computing scenarios in which the disclosed subject matter may be utilized and/or implemented.

In some instances, an operator may determine to modify a wireless telecommunication network. For example, an operator may determine that a new base station is to be installed to enable the wireless telecommunication network to accommodate additional user equipment (UE), that the wireless telecommunication network is to be reconfigured to increase a quality of service associated with the wireless telecommunication network, that a site within the wireless telecommunication is to be decommissioned, and/or other modifications.

Prior to modifying the wireless telecommunication net-work, the operator may run a simulation to determine the effect of the modification on the wireless telecommunication network. For example, the operator may run a simulation to determine an increase in a quantity of UEs that can be accommodated by the wireless telecommunication network that may result from installing the new base station, whether a change to the configuration of the wireless telecommuni-cation network will improve the quality of service associated with the wireless telecommunication network, and/or other effects of the modification.

To run the simulation, the user may utilize individual hardware components to simulate the devices (e.g., the UEs, the base stations, and/or other network components) included in the wireless telecommunications network. The hardware components may communicate via wireless com-munication. To prevent unwanted signals from interfering with the simulation, the hardware components may be placed in a dedicated, shielded room. The use of a dedicated, shielded room increases a complexity and/or a cost with running the simulation. Further, the number of components that can be included in the simulation may be limited by a size of the room.

Alternatively, the user may utilize a software-based sys-tem to perform the simulation. The software-based system may utilize software components to simulate the devices included in the wireless telecommunications network. The use of the software components may eliminate the need to perform the simulation in a dedicated, shielded room. How-ever, the software system may be limited to simulations including a single UE and a single base station. Further, the time required to execute the simulation may be greatly increased relative to utilizing individual hardware compo-nents to simulate the devices.

Some implementations described herein enable a network analysis system to simulate a performance of a wireless telecommunications network. For example, the network analysis system may obtain simulation data indicating various characteristics of the wireless telecommunications network and may utilize a combination of hardware and software to generate a simulated environment corresponding to the wireless telecommunications network based on the simulation data. The simulated environment may include a plurality of physical and/or virtual base stations and virtual and/or physical UEs instantiated on physical computing devices connected via a physical network, such as an Ethernet network. Utilizing the virtual and/or physical base stations and virtual and/or physical UEs enables the wireless telecommunications network to generate a simulated environment that includes tens, hundreds, thousands, or more base stations and/or UEs utilizing fewer physical resources relative to other systems.

A physical layer of the devices transmits data between a UE and a base station via the physical network. When the data is transmitted, the network analysis system may determine a location of the UE based on the simulation data. The network analysis system may obtain channel condition information associated with the location of the UE from a data structure storing channel condition information for a plurality of locations within a geographical area associated with the wireless telecommunications network. The channel condition information for a location may include information indicating RF characteristics associated with a signal transmitted between the UE and the base station while the UE is located at the location.

The channel condition information may be determined and stored in the data structure prior to the network analysis system simulating the performance of the wireless telecommunications network. For example, the network analysis system may obtain actual channel condition information associated with locations within a coverage area of the wireless telecommunications network, the network analysis system may utilize machine learning to determine the channel condition information, and/or the like. In this way, the network analysis system may conserve time and computing resources (e.g., processing resources, memory resources, communication resources, and/or the like) that otherwise would have been utilized to determine the channel condition information during the simulation. The conservation of time and computing resources enables the network analysis system to simulate a performance of a larger wireless telecommunications network (e.g., a greater quantity of base stations, a greater quantity of UEs operating within the wireless communications network, and/or the like) relative to a system that determines the channel condition information during the simulation of the wireless telecommunications network.

Further, by utilizing channel information stored in the data structure, the network analysis system may reduce an amount of computations performed to determine channel conditions associated with the simulation relative to systems that calculate channel condition information for each data transmission. A reduction in the amount of computations performed to determine the channel conditions may conserve computing resources (e.g., processing resources, memory resources, communication resources, and/or the like) that would have otherwise been used by prior systems that perform a greater amount of computations.

In some embodiments, the network analysis system applies channel conditions to the data and inserts the channel condition information into the transmitted data. By inserting channel conditions into traffic between the UE and the base station, the network analysis system may be more flexible and/or may more accurately reflect real life scenarios relative to other systems for simulating wireless communications. Further, by applying the channel conditions to the data, the network analysis system simulates the transmission of the data via a wireless telecommunications network without requiring a dedicated, shielded room.

In one example simulation scenario, a first UE located near an edge of a coverage area served by a first base station is susceptible to downlink and/or uplink interference from signals communicated between a second UE and a second base station serving the second UE. In some instances the first base station assigns one or more physical resource blocks (PRBs) to the first UE that are the same as those assigned by the second base station for communicating with the second UE. The uplink or downlink signals associated with the second base station and the second UE result in interference for the first UE. To accurately simulate an environment with multiple base stations with downlink and uplink interference, the PRBs assigned to various UE are communicated so that each UE can estimate its channel conditions, including interference. This information is communicated with the wired simulation environment without degrading the real time aspect of the simulation by sending the interference information only to those entities that use the data to estimate interference. Using targeted message as opposed to broadcast messages reduces message traffic and improves performance of the simulation environment.

In some embodiments, for a downlink simulation, the base stations exchange downlink resource allocation maps (DL_RAM) with neighboring base stations. The DL-RAM for a given base station lists the PRBs allocated to UE served by the given base station. Each base station sends a downlink control information (DCI) message indicating transmission time interval (TTI) PRB allocations its served UE. Each base station also sends the DL-RAM of neighboring base stations to each served UE. In some embodiments, the UE identifies the DL-RAMs (of the base stations causing interference to its signal and) that include PRBs that overlap its assigned PRBs in the DCI and determines interference using the identified DL-RAMs. The UE ignores DL-RAMs without overlapping PRBs. For example, if a first base station assigns PRBs 1-5 to a first UE in the DCI, and a second base station assigns one or more of PRBs 1-5 to one or more of its served UE in its DCI, the first UE uses the DL-RAM for the second base station to calculate interference. This approach reduces message traffic in that the DL-RAM information is distributed by the base stations to their served UE such that each UE only receives overhead messages from a single serving base station and the amount of overhead messages is constant regardless of the number of UE being affected by other base stations.

In some embodiments, the DL-RAM for a neighboring base station is only sent to the UE if overlapping PRBs are used by the neighboring base station. For example, the first base station knows the PRBs assigned to the first UE in the DCI. If a third base station does not assign PRBs 1-5 to any of its served UE, the DL-RAM for the third base station is not sent by the first base station to the first UE. This approach further reduces message traffic in that each UE only receives the DL-RAMs for the base stations that can cause interference.

In some embodiments, for an uplink simulation, each base station generates an uplink resource allocation map and, in addition, the base station includes a list of transmitting UEs for a given transmission time interval (TTI), an uplink resource allocation map (UL_UERAM) for each TTI, and radio frequency (RF) condition data for each scheduled UE in the given TTI. Each base station shares its upload map for scheduled UE with neighboring base stations. Each base station uses the uplink? maps and the RF conditions for the scheduled UEs from neighboring base stations to calculate interference.

Embodiments described herein also include a system for simulating a wireless telecommunications network including a first user equipment (UE) module and a second UE module connected to a wired network. A first base station (BS) module is associated with the first UE module and coupled to the wired network. A second BS module is associated with the second UE module and coupled to the wired network. The first BS module is configured to send a first resource allocation map to the second BS module and one of the second UE module or the second BS module is configured to generate an interference metric based on the first resource allocation map and modulate a data transmission between the second UE module and the second BS module based on the interference metric.

In a further aspect of the system, the second BS module is configured to send the resource allocation map to the second UE module. The data transmission comprises a downlink data transmission from the second BS module to the second UE module. The second UE module is configured to generate the interference metric based on a path loss parameter between the first BS module and the second UE module.

Further aspects of the system comprise a third UE module connected to the wired network. The first BS module is associated with the third UE module. The first BS module is configured to send a first downlink control information (DCI) message to the first UE module and send a second DCI message to the third UE module. The first BS module is configured to generate the first resource allocation map based on the first DCI message and the second DCI message.

In a further aspect of the system, the data transmission comprises an uplink data transmission from the second UE module to the second BS module and the second BS module is configured to generate the interference metric based on a path loss parameter between the first UE module and the second BS module.

Further aspects of the system comprise a third UE module connected to the wired network. The first BS module is associated with the third UE module. The first BS module is configured to send a first uplink control information (UCI) message to the first UE module and send a second UCI message to the third UE module. The first BS module is configured to generate the first resource allocation map based on the first UCI message and the second UCI message.

In a further aspect of the system, the resource allocation map comprises a first path loss parameter associated with the first UE module and the second BS module and a second path loss parameter associated with the third UE module and the second BS module.

Further aspects of the system comprise an RF channel emulator configured to generate a path loss parameter between the first BS module and the second UE module. The one of the second UE module or the second BS module is configured to generate the interference metric based on the first resource allocation map and the path loss parameter.

In a further aspect of the system, the first UE module comprises a UE emulator configured to simulate a physical layer (PHY) and a medium access control (MAC) module.

Further aspects of the system comprise a switch module having a first side coupled to the first UE module and the second UE module and a second side coupled to the first BS module and the second BS module.

Embodiments described herein also include a method comprising instantiating a first user equipment (UE) module on a first computing device and instantiating a second UE module on a second computing device connected to the first computing device by a wired network. A first base station (BS) module associated with the first UE module is instantiated on a third computing device coupled to the wired network and a second BS module associated with the second UE module is instantiated on a fourth computing device coupled to the wired network. A first resource allocation map is sent from the first BS module to the second BS module. An interference metric is generated based on the first resource allocation map. A data transmission between the second UE module and the second BS module is modulated based on the interference metric.

Further aspects of the method comprise sending the resource allocation map from the second BS module to the second UE module and generating the interference metric by the second UE module based on a path loss parameter between the first BS module and the second UE module. The data transmission comprises a downlink data transmission from the second BS module to the second UE module.

Further aspects of the method comprise instantiating a third UE module associated with the first BS module on a fifth computing device connected to the wired network. A first downlink control information (DCI) message is sent from the first BS module to the first UE module. A second DCI message is sent from the first BS module to the third UE module. The first resource allocation map is generated based on the first DCI message and the second DCI message.

Further aspects of the method comprise generating the interference metric in the second BS module based on a path loss parameter between the first UE module and the second BS module. The data transmission comprises an uplink data transmission from the second UE module to the second BS module.

Further aspects of the method comprise instantiating a third UE module associated with the first BS module on a fifth computing device connected to the wired network. A first uplink control information (UCI) message is sent from the first BS module to the first UE module. A second UCI message I sent from the first BS module to the third UE module. The first resource allocation map is generated based on the first UCI message and the second UCI message.

In a further aspect of the method, the resource allocation map comprises a first path loss parameter associated with the first UE module and the second BS module and a second path loss parameter associated with the third UE module and the second BS module.

Further aspects of the method comprise instantiating an RF channel emulator configured to generate a path loss parameter between the first BS module and the second UE module on a fifth computing device. Generating the interference metric comprises generating the interference metric based on the first resource allocation map and the path loss parameter.

In a further aspect of the method, the first UE module comprises a UE emulator configured to simulate a physical layer (PHY) and radio interface and a medium access control (MAC) module.

Further aspects of the method comprise instantiating a switch module having a first side coupled to the first UE module and the second UE module and a second side coupled to the first BS module and the second BS module on a fifth computing device.

Embodiments described herein also include a non-transitory computer-readable medium storing instructions thereon that when executed by a processor cause the processor to send a first resource allocation map comprising resource allocations for a first user equipment UE module associated with a first BS module from the first BS module to a second BS module. An interference metric is generated based on the first resource allocation map. A data transmission between a second UE module associated with the second BS module and the second BS module is modulated based on the interference metric.

In a further aspect of the medium, the processor is to generate the interference metric in the second BS module based on a path loss parameter between the first UE module and the second BS module.

Figure 1B:
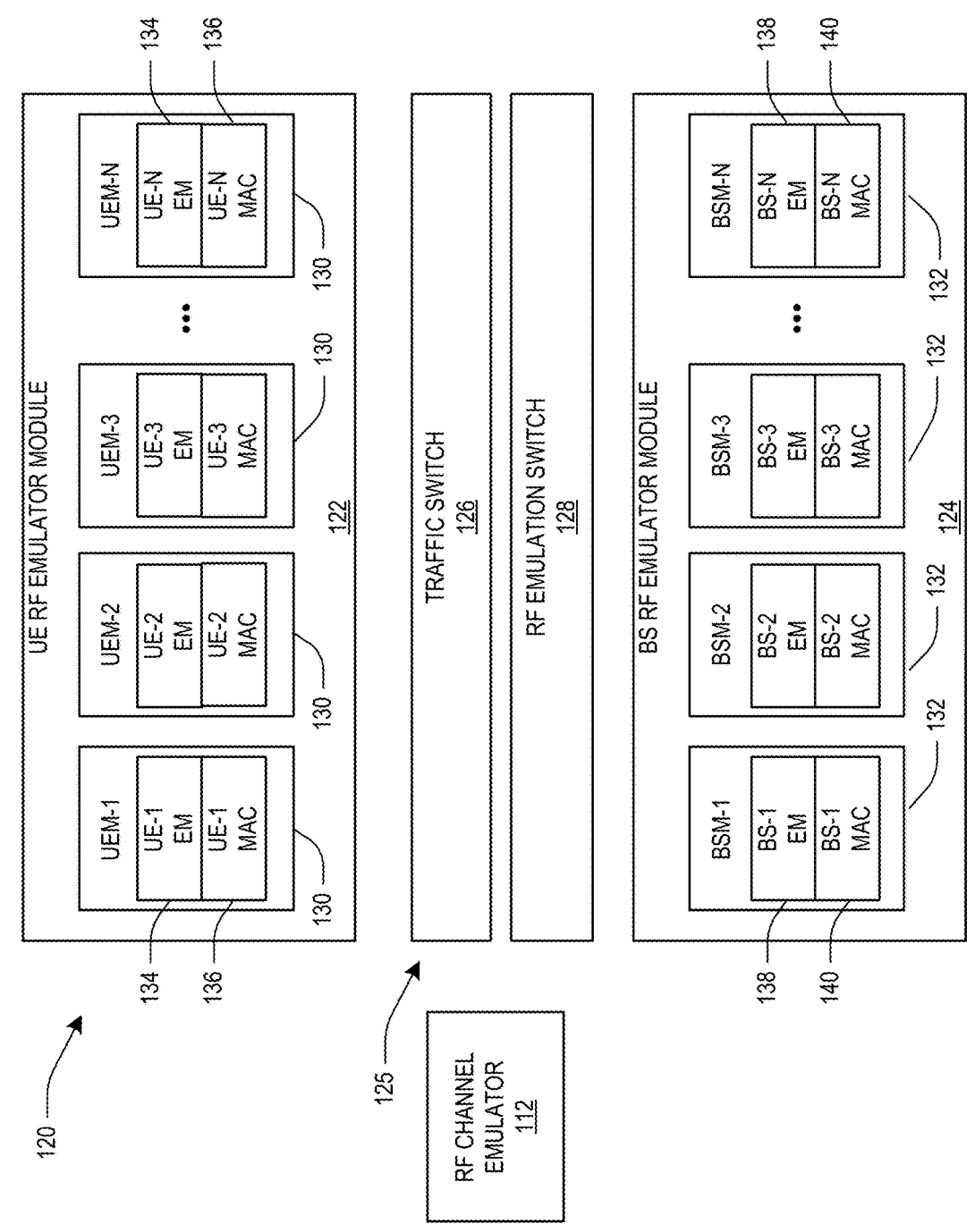

FIGS. 1A-1C are diagrams of one or more example implementations 100, according to some embodiments. Referring to FIGS. 1A-1C, a network analysis system 102 is utilized to generate and/or run a simulation 104 of a wireless telecommunications network 106, according to some embodiments. In some embodiments, the network analysis system 102 utilizes a result of the simulation to perform a diagnostic analysis on the wireless telecommunications network 106.

Referring to FIG. 1A, the network analysis system 102 receives simulation information. In some embodiments, the simulation information comprises information for generating a simulated environment corresponding to the wireless telecommunications network 106 and/or information for executing or running the simulation 104 of the wireless telecommunications network 106. In some implementations, the simulation information comprises control information, network information, base station information, UE information, and/or the like. In some embodiments, the control information comprises information associated with generating and/or running the simulation 104. For example, the control information may include information indicating a length of the simulation 104 (e.g., 1 hour, 1 day, 1 week, and/or the like), information indicating a weather condition associated with the simulation 104 (e.g., sunny, rainy, overcast, and/or the like), and/or other suitable control information.

In some embodiments, the network information comprises information indicating one or more characteristics of the wireless telecommunications network 106. For example, the network information may include information indicating a frequency band associated with the wireless telecommunications network 106 (e.g., a millimeter frequency band, a 5 GHz frequency band, and/or another frequency band), information indicating a geographical area associated with the wireless telecommunications network 106 (e.g., a coverage area associated with the wireless telecommunications network 106), information indicating key performance indicators associated with the wireless telecommunications network 106, and/or other suitable network information.

In some embodiments, the base station information comprises information associated with one or more base stations 108 (individually referenced as BS-1, BS-2, BS-3) included in the wireless telecommunications network. For example, the base station information may include information identifying a quantity of base stations 108 included in the wireless telecommunications network 106, information indicating a geographical location (e.g., a latitude, a longitude, and/or the like) of a base station 108, information indicating a frequency band associated with a base station 108, information indicating a configuration of a base station 108, information indicating a capacity of a base station 108, and/or other suitable base station information.

In some embodiments, the UE information comprises information associated with one or more UEs 110 (individually referenced as UE1-UE9) operating within the wireless telecommunications network 106. For example, the UE information may include UE location information, UE transmission information, UE characteristic information, and/or other suitable UE information.

In some embodiments, the UE location information comprises information indicating a location of a UE 110 and/or a path of travel of the UE 110 during the simulation 104. For example, the UE location information may include information indicating a geographical location at which the UE 110 is located, information indicating a time at which the UE 110 is located at the geographical location, information indicating a route the UE 110 is to travel along, information indicating a direction of travel associated with the UE 110, information indicating a speed associated with the UE 110 (e.g., a speed at which the UE 110 is traveling along the path of travel), and/or other suitable UE location information.

In some embodiments, the UE transmission information comprises information associated with data traffic transmitted to, or received by, the UE 110. For example, the UE transmission information may include information indicating a time and/or a location at which the data traffic is transmitted to, or received by, the UE 110, information indicating a type of data traffic (e.g., a request to establish a wireless communication session, a reference signal, an acknowledgement, and/or another suitable data traffic type) being transmitted or received.

In some embodiments, the UE characteristic information comprises information identifying one or more characteristics of the UE 110. For example, the UE characteristic information may include information indicating an identifier associated with the UE 110, information indicating a type of the UE 110 (e.g., a smart phone, a laptop, an autonomous vehicle, and/or other suitable UE type), information indicating a frequency band associated with the UE 110, information indicating a number of antennas associated with the UE 110, information indicating a transmission power associated with the UE 110, and/or other suitable UE characteristic information.

In some implementations, the simulation information is received from another device, such as a device included in the wireless telecommunications network 106 or a device storing historical data associated with the wireless telecommunications network 106. For example, the network analysis system 102 may receive the simulation information from a base station 108 and/or a UE 110 included in the wireless telecommunications network 106. The base station 108 and/or the UE 110 may provide the simulation information to the network analysis system 102 periodically, based on receiving a request from the network analysis system 102, based on establishing a connection with the wireless telecommunications network 106, and/or based on other suitable criteria. In some embodiments, the network analysis system 102 receives the simulation information and stores the simulation information in a data structure (e.g., a database, a table, a list, and/or another suitable data structure).

In some implementations, a portion of simulation information is input by a user. A user may desire to run the simulation 104 of the wireless telecommunications network 106. The user may input the simulation information via a user interface provided by a client device associated with the network analysis system 102. In some embodiments, the network analysis system 102 receives the simulation information input by the user and stores the simulation information in the data structure.

In some embodiments, the network analysis system 102 comprises a RF channel emulator 112 to determine channel conditions associated with the simulation 104. In some embodiments, the RF channel emulator 112 is a module of the network analysis system 102 that inserts channel conditions into an uplink channel and/or a downlink channel during the simulation 104, as described below.

In some embodiments, the channel conditions include information indicating RF characteristics of data being transmitted between a UE 110 and a base station 108. In some embodiments, the channel conditions include information corresponding to information transmitted between a base station 108 and a UE 110 to enable the base station 108 and the UE 110 to determine channel conditions associated with transmitting data between the base station 108 and the UE 110. For example, the channel conditions may include information indicating a quality and/or a strength of a signal transmitted via an uplink channel (e.g., from a UE 110 to a base station 108) and/or information indicating a quality and/or a strength of a signal transmitted via a downlink channe (e.g., from a base station 108 to a UE 110) such as information indicating a reference signal received power (RSRP), information indicating a reference signal received quality (RSRQ), information indicating a signal to interference plus noise ratio (SINR), information indicating a received signal strength indicator (RSSI), and/or the like.

In some embodiments, the network analysis system 102 comprises a network mapping module 114 to determine a plurality of locations included within a geographical area associated with the wireless telecommunications network 106. The plurality of locations may correspond to locations of UEs 110 as the UEs 110 travel through the wireless telecommunications network 106. In some embodiments, the network analysis system 102 utilizes the plurality of locations to determine the channel conditions associated with the UEs 110, as described in greater detail below.

In some implementations, the network analysis system 102 determines the plurality of locations based on information input by a user. The user may input information identifying the plurality of locations and/or information for determining the plurality of locations (e.g., a quantity of the plurality of locations, a distance separating adjacent locations (e.g., 1 meter, 3 meters, 10 meters, and/or other suitable distances), and/or other suitable location information).

In some implementations, the simulation information comprises information identifying the plurality of locations and/or information for determining the plurality of locations. The network analysis system 102 determines the plurality of locations based on the simulation information.

In some embodiments, the network analysis system 102 determines channel conditions associated with the plurality of locations. In some embodiments, the network analysis system 102 determines an uplink channel condition and a downlink channel condition associated with data being transmitted between a UE 110, located at a particular location, and one or more base stations 108 associated with a coverage area that includes the particular location. The network analysis system 102 determines the uplink channel condition and the downlink channel condition for each of the plurality of locations. In some embodiments, the network analysis system 102 determines the channel conditions based on information input by a user, information obtained from a model associated with the wireless telecommunications network 106, historical data associated with the wireless telecommunications network 106, and/or the like. In some embodiments, the network analysis system 102 stores the channel conditions associated with the plurality of locations in a channel conditions data structure 116.

In some implementations, the network analysis system 102 employs multiple channel conditions data structures 116. Different channel conditions data structures 116 may be associated with various different characteristics of the wireless telecommunications network 106, such as a frequency associated with the wireless telecommunications network 106, a geographical characteristic (e.g., mountainous, flat, and/or other geographical characteristic), and/or some other characteristic).

As an example, a first channel conditions data structure 116 is associated with a first frequency spectrum (e.g., 2.5 GHz) and a second channel conditions data structure 116 is associated with a second frequency spectrum (e.g., 5 GHz). The first channel conditions data structure 116 stores information indicating channel conditions associated with data being transmitted between the UE 110 and a base station 108 from a location of the UE 110 via the first frequency spectrum. The second channel conditions data structure 116 stores information indicating channel conditions associated with data being transmitted between the UE 110 and the base station 108 from the location of the UE 110 via the second frequency spectrum.

Referring to FIG. 1B, the network analysis system 102 configures UE modules 130 and BS modules 132 for the simulation 104. In some embodiments, the UE modules 130 and the BS modules 132 are implemented in a physical layer emulation (PLE) 120 to simulate the effect of performing physical layer processes associated with uplink transmissions (e.g., coding, rate matching, scrambling, modulation, layer mapping, pre-coding transmission power, resource element mapping, beam forming port expansion, inverse fast Fourier transform (iFFT), cyclic prefix insertion, and/or other suitable uplink processes) and/or physical layer processes associated with downlink transmissions (e.g., cyclic prefix removal, fast Fourier transform (FFT), port reduction, resource element mapping, channel estimation, diversity combiner, equalization, inverse discrete Fourier transform (iDFT), demodulation, descrambling, rate matching, decoding, and/or other suitable downlink processes).

In some embodiments, the PLE 120 comprises the RF channel emulator 112, a UE RF emulator module 122 that instantiates UE modules 130 (individually references as UEM-1-UEM-N), a base station RF emulator module 124 that instantiates BS modules 132 (individually referenced as BSM-1-BSM-N), and a switch module 125 comprising a traffic switch 126, and an RF emulation switch 128.

In some embodiments, the UE modules 130 correspond to one or more UEs 110 operating within the wireless telecommunications network 106 being simulated. In some embodiments, a UE module 130 comprises the hardware of a UE 110 with the wireless portion of the hardware being emulated. The network analysis system 102 may determine the quantity of UEs 110 operating within the wireless telecommunications network 106 based on the simulation information. In some embodiments, the network analysis system 102 configures the UE RF emulator module 122 to control channel condition application for a predetermined number of UE modules 130, where the traffic of each UE 110 is independent of the other UEs 110. The quantity of UE modules 130 may be configured to emulate a performance of a quantity of UEs 110 operating within the wireless telecommunications network 106. Furthermore the UE RF emulator module 122 may drop packets from downlink transmissions based on the channel conditions obtained from the RF channel emulator 112.

In some implementations, the UE module 130 comprises a virtual machine instantiated on a computing device. The virtual machine may share the same physical resources (e.g., an Ethernet interface, a central processing unit (CPU), a memory, and/or the like) with other virtual machines corresponding to other UE modules 130. In some implementations, the UE RF emulator module 122 comprises a plurality of UE modules 130 instantiated on the same computing device. In some embodiments, the network analysis system 102 determines to instantiate the plurality of UE modules 130 on the same computing device based on a quantity of computing resources required to instantiate the plurality of UE modules 130, a quantity of the plurality of UE modules 130 failing to satisfy a threshold quantity, and/or other suitable criteria.

In some implementations, the plurality of UE modules 130 are instantiated on a plurality of computing devices. In some embodiments, the network analysis system 102 determines to instantiate the plurality of UE modules 130 on the plurality of computing devices based on the quantity of computing resources required to instantiate the plurality of UE modules 130, the quantity of the plurality of UE modules 130 satisfying the threshold quantity, and/or other suitable criteria.

In some embodiments, a UE module 130 comprises a UE emulator 134 (individually referenced as UE-1 EM-UE-N EM) and a UE medium access control (MAC) component 136 (individually referenced as UE-1 MAC-UE-N MAC). In some embodiments, the UE emulators 134 are configured to simulate the impact of the physical layer (PHY) and the air interface of the UE 110, e.g. taking into account propagation delay, the RF conditions, fading conditions based on the location of the UE relative to radio access network (RAN) elements and the like. In some embodiments, the network analysis system 102 configure the UE emulators 134 to transmit MAC transport data via an Ethernet network. The UE emulators 134 may use channel condition information associated with a location of the UE module 130 to cause the MAC transport data to simulate an RF signal transmitted by the UE 110 within the wireless telecommunications network. In some embodiments, the UE emulators 134 determine downlink interference metrics associated with transmissions between other UEs 110 and associated base stations 108 using the same PRBs.

In some embodiments, each UE MAC component 136 is configured to simulate a MAC layer of the UE 110. In some embodiments, the UE MAC component 136 determines RF characteristics associated with the MAC transport data based on the channel condition information. In some embodiments, the UE MAC component 136 extracts the channel condition information from data transmitted to the UE module 130 by the BS module 132. The UE MAC component 136 schedules data to be transmitted to the BS module 132 based on the channel conditions.

In some embodiments, the UE MAC component 135 comprises a hybrid automatic repeat request (HARQ) element, a multiplexing and de-multiplexing element, a logical channel prioritization element, a control element, and/or other suitable MAC elements. In some embodiments, the HARQ element simulates a transmit HARQ operation and/or a receive HARQ operation. The transmit HARQ operation includes transmission of transport blocks, reception and processing of HARQ acknowledgement signaling, and/or other suitable HARQ functions. In some embodiments, the receive HARQ operation includes the reception of transport blocks, the combining and decoding of the received transport blocks, and/or the generation of HARQ acknowledgement signaling.

The base station RF emulator module 124 may be configured to simulate a quantity of BS modules 132. In some embodiments, the network analysis system 102 determines a quantity of base stations 108 operating within the wireless telecommunications network 106 based on the simulation information. The network analysis system 102 may configure the base station RF emulator module 124 to include a corresponding quantity of BS modules 132. In some embodiments, the base station RF emulator module 124 may drop one or more packets received from the plurality of UEs 110 based on channel conditions associated with the plurality of UEs 110. In this embodiment, the channel conditions are shared with the base station RF emulator module 124 by the RF channel emulator 112.

In some implementations, the BS module 132 comprises a virtual machine instantiated on a computing device. The BS module 132 is configured to receive data transmitted by a UE module 130 via a physical layer abstraction implemented on a physical layer of the computing device. In some embodiments, the BS module 132 is configured to simulate the channel conditions associated with the received data based on the channel condition information inserted by the RF channel emulator 112.

In some implementations, the base station RF emulator module 124 comprises a plurality of BS modules 132 instantiated on the same computing device. The network analysis system 102 may determine to instantiate the plurality of BS modules 132 on the same computing device based on a quantity of computing resources required to instantiate the plurality of BS modules 132, a quantity of the plurality of BS modules 132 failing to satisfy a threshold quantity, and/or or other suitable criteria.

In some implementations, the plurality of BS modules 132 are instantiated on a plurality of computing devices. The network analysis system 102 may determine to instantiate the plurality of BS modules 132 on the plurality of computing devices based on the quantity of computing resources required to instantiate the plurality of BS modules 132, the quantity of the plurality of BS modules 132 satisfying the threshold quantity, and/or or other suitable criteria.

In some embodiments, the BS module 132 is configured to emulate a performance of a base station 108 operating within the wireless telecommunications network 106. In some embodiments, the BS module 132 comprises a BS emulator 138 (individually referenced as BS-1 EM-BS-N EM) and a BS MAC component 140 (Individually referenced as BS-1 MAC-BS-N MAC). In some embodiments, a BS emulator 138 is configured to simulate a physical layer of a base station 108. The BS emulator 138 receives channel conditions associated with a UE 110 inserted into uplink data transmitted by a UE module 130 corresponding to the UE 110 by the RF channel emulator 112. In some embodiments, the BS emulator 138 determines a quality of the uplink data based on the channel conditions. In some embodiments, the BS module 132 inserts corresponding downlink reference messages into downlink data transmitted to the UE module 130. The BS module 132 modulates the downlink data based on the channel conditions.

In some embodiments, the BS MAC component 140 is configured to determine an allocation of communication resources, such as PRBs, to the UE module 130 based on the channel conditions.

In some embodiments, the BS module 132 determines uplink interference metrics associated with transmissions between other base stations 108 and associated UEs 110 using the same PRBs.

In some embodiments, the network analysis system 102 determines one or more characteristics of the BS emulator 138 based on the simulation information. For example, the network analysis system 102 may determine a transmission frequency associated with the BS emulator 138, a quantity of antennas associated with the BS emulator 138, and/or other suitable base station parameters based on the base station information included in the simulation information. The network analysis system 102 configures the BS emulator 138 based on the one or more characteristics.

In some embodiments, the RF channel emulator 112 comprises a graphical user interface (GUI) and path planning module and a channel conditions lookup module. In some embodiments, the RF channel emulator 112 is configured to obtain channel condition information associated with transmitting data between a UE 110 and a base station 108 based on a location of the UE 110 and/or a location of the base station 108. In some embodiments, the network analysis system 102 configures the RF channel emulator 112 to insert information indicating an effect of the physical layer impairment (e.g., channel condition information) into MAC transport data transmitted between a base station module and a UE module. For example, the network analysis system 102 may configure the RF channel emulator 112 to insert information indicating an uplink channel condition and/or information indicating a downlink channel condition into MAC transport data transmitted between the UE module and the base station module.

In some embodiments, the RF channel emulator 112 receives data transmitted between the BS module 132 and the UE module 130. In some embodiments, the RF channel emulator 112 applies a time stamp to the data. The time stamp may also be provided by a centralized service to the GUI and path planning module.

In some embodiments, the GUI and path planning module utilizes the time stamp to determine location information associated with the UE module 130 based on the simulation information. The simulation information may include information associating time stamps with locations of a UE 110 associated with the UE module 130. The GUI and path planning module determine the location of the UE 110 based on a pre-defined path. The location of the UE 110 is shared with the RF channel emulator 112. The RF channel emulator 112 then extracts the RF channel conditions for that particular UE 110 based on the relative location of the UE 110 to the various surrounding base stations. The RF channel emulator 112 may be configured to apply the channel conditions.

In some implementations, the RF channel emulator 112 may modify the one or more portions of the data by inserting Gaussian noise into the data. The RF channel emulator 112 may determine an amount of Gaussian noise to be inserted into the data based on actual channel conditions associated with the location of the UE 110. For example, the channel condition information may include information identifying a signal-to-noise ratio associated with the location of the UE. The RF channel emulator 112 may determine the amount of Gaussian noise to be inserted into the data based on the signal-to-noise ratio. The RF channel emulator 112 may insert the channel condition information into the data and may utilize the switch module 125 to provide the data to the UE module 130 and/or the BS module 132.

In some embodiments, the switch module 125 simulates processes associated with composing and decomposing MAC packet data units (PDUs), multiplexing data from multiple logical channels into a transport channel, de-multiplexing data from the transport channel into the multiple logical channels, and/or other suitable operations.

In some embodiments, the logical channel prioritization element of the UE MAC component 135 simulates processes for instructing the multiplexing and de-multiplexing element to generate MAC PDUs when radio resources for a new transmission are allocated, determining an amount of data from each logical channel that is to be included in each MAC PDU when radio resources for a new transmission are available, and/or other suitable operations. In some embodiments, the control element of UE MAC component 135 simulates processes associated with discontinuous reception (DRX) procedures, requesting resources, alignment of an uplink timing, power headroom reporting, and/or other suitable operations.

In some embodiments, the switch module 125 is a virtual switch coupled to the UE modules 130 on a first side and coupled to the BS modules 132 on a second side. In some embodiments, the switch module 125 is configured to time stamp and/or schedule data to simulate data transmitted on a shared channel via the wireless telecommunications network 106. In some embodiments, the switch module 125 is configured to receive an integrated data stream from the BS modules 132. The integrated data stream may include data for a plurality of UE modules 130. In some embodiments, the switch module 125 is configured to generate independent data streams for each simulated or physical UE 110 and provide the data to the particular UE 110 via the independent data stream. In some embodiments, the switch module 125 is configured to receive data from multiple UE modules 130. The switch module 125 aggregates the received data and transmits the aggregated data to the BS module 132.

In some implementations, the switch module 125 transmits data to the UE module 130 and the BS module 132 based on an IP address associated with the UE module 130. In some embodiments, the network analysis system 102 assigns an IP address to each BS module 132 and/or to each UE module 130. The switch module 125 transmits data between the BS module 132 and the UE module 130 based on the assigned IP addresses.

In some embodiments, the traffic switch 126 comprises a high speed Ethernet switch having a high speed interface (e.g., a 10 Gb/s or greater interface). In some embodiments, the network analysis system 102 configures the traffic switch 126 to process data transmitted via a user plane. In some embodiments, the RF emulator switch 128 comprises a low speed Ethernet switch having a low speed interface (e.g., a 1 Gb/s or lower interface). In some embodiments, the network analysis system 102 configures the RF emulator switch to process data transmitted via a control plane. Because an amount of data transmitted via the control plane may be small relative to an amount of data transmitted via the user plane, utilizing the low speed Ethernet switch may enable the network analysis system 102 to conserve computing resources and/or may reduce a cost associated with the network analysis system 102.

According to some embodiments, the network analysis system 102 generates and runs the simulation 104. In some embodiments, the network analysis system 102 employs the RF channel emulator 112, the UE RF emulator module 122, the base station RF emulator module 124, and/or the switch module 125 to execute or run the simulation 104 of a wireless communication session according to the channel conditions. The network analysis system 102 may generate and/or run the simulation 104 as described in greater detail below with respect to FIGS. 2, 3, and 4.

Figure 10:
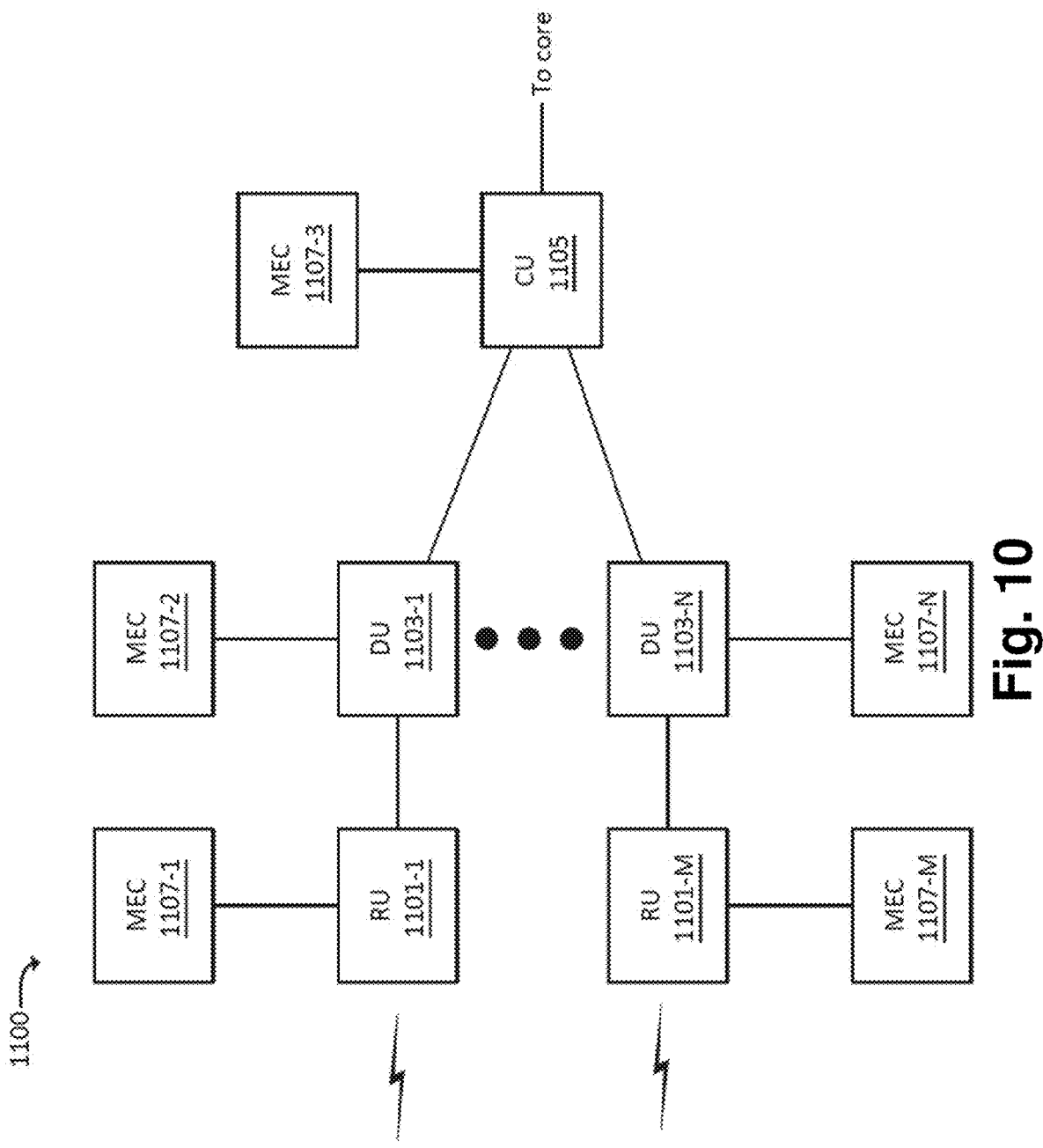
FIG. 10 is an illustration of an example network that may utilize and/or implement at least a portion of the techniques presented herein.

As shown in FIG. 10, the network analysis system 102 performs one or more actions based on running the simulation 104. In some implementations, the one or more actions include providing simulation results. For example, the network analysis system 102 may perform a diagnostic analysis of the wireless telecommunications network 106 based on running the simulation 104. The diagnostic analysis may determine how a planned modification to the wireless telecommunications network 106 affects a performance of the wireless telecommunications network 106. The network analysis system 102 may provide a result of the diagnostic analysis for display on a device associated with a network operator. In this way, the network analysis system 102 may enable a user (e.g., the network operator) to quickly and efficiently determine how a planned modification may affect the performance of the wireless telecommunications network 106.

In some implementations, the one or more actions include causing a modification to the wireless telecommunications network 106 to adjust channel conditions. The network analysis system 102 may determine that a performance characteristic of a wireless communication session associated with a virtual base station and a virtual user equipment does not satisfy a threshold based on running the simulation 104. The network analysis system 102 may cause a modification to a base station 108 corresponding to the virtual base station and/or to the wireless telecommunications network 106 to improve channel conditions associated with the base station 108 based on determining that the channel characteristic does not satisfy the threshold. In this way, the network analysis system 102 may automatically modify the wireless telecommunications network 106 to improve the performance of the wireless telecommunications network 106. By automatically modifying the wireless telecommunications network 106, the network analysis system 102 may conserve computing resources, human resources, and/or the like that may have otherwise been utilized to cause a modification to the wireless telecommunications network 106 to adjust channel conditions.

In some implementations, the one or more actions include generating and sending a notification to a service representative to service one or more of the base stations 108 of the wireless telecommunications network 106 and/or causing an autonomous vehicle to be dispatched to address an issue with the wireless telecommunications network 106. The network analysis system 102 may determine that a performance characteristic of a wireless communication session associated with a virtual base station and a virtual user equipment does not satisfy a threshold based on running the simulation 104. The network analysis system 102 may generate and/or send a notification to a service representative to service a base station 108 corresponding to the virtual base station and/or cause an autonomous vehicle to be dispatched to address an issue with the base station 108 based on the performance characteristic not satisfying the threshold.

FIG. 1C is a diagram of an example implementation 100, according to some embodiments. As shown in FIG. 10, the switch module 125 may enable data to be transmitted between the BS module 132 and the UE module 130 via an uplink channel 150 and a downlink channel 152 according to channel conditions from the channel conditions data structure 116 determined by the RF channel emulator 112. In some embodiments, the BS module 132 simulates an antenna of a base station 108 included in the wireless telecommunications network 106 and transmits downlink data (e.g., a reference signal) to the switch module 125 via the downlink channel 152.

In some embodiments, the switch module 125 is configured to handle communications of a wireless communication session. In some implementations, the switch module 125 forwards unicast messages generated based on a broadcast message received from a BS module 132. For example, the switch module 125 may receive a broadcast message from a BS module 132. The broadcast message may include information associated with a set of UE modules 130. In some embodiments, the RF channel emulator 112 analyze the broadcast messages and determines the set of UE modules associated with the broadcast message. The RF channel emulator 112 may convert the broadcast message into a plurality of unicast messages associated with the set of UE modules. The RF channel emulator 112 may provide the plurality of unicast messages to the switch module 125. The switch module 125 may forward the plurality of unicast messages to the set of UE modules. In this way, the RF channel emulator 112 and the switch module 125 may reduce an amount of data transmitted between the BS module 132 and the UE modules thereby conserving computing resources that otherwise would have been utilized to transmit the broadcast message to a UE module that is not associated with the broadcast message.

In some implementations, the switch module 125 provides consolidated data to a UE module 130 and/or a BS module 132. For example, the switch module 125 may receive a broadcast message associated with a set of UE modules 130 and a first unicast message associated with a UE module 130 included in the set of UE modules 130. The RF channel emulator 112 may convert the broadcast message into a plurality of unicast messages associated with the set of UE modules 130. The RF channel emulator 112 may determine that a second unicast message, of the plurality of unicast messages, is associated with the UE module 130. The RF channel emulator 112 may generate consolidate the first unicast message and the second unicast message to generate consolidated data based on the first unicast message and the second unicast message being associated with the UE module 130. The RF channel emulator 112 may provide the consolidated data to the switch module 125 and the switch module 125 may transmit the consolidated data to the UE module 130. In this manner, the RF channel emulator 112 and the switch module 125 may conserve computing resources that otherwise would have been utilized to transmit two separate unicast messages to the UE module 130.

Prior to the switch module 125 forwarding the downlink data to a UE module 130, the RF channel emulator 112 may obtain channel conditions from the channel conditions data structure 116 associated with the downlink data based on a location of the UE 110 emulated by the UE module 130 relative to the base station 108 emulated by the BS module 132. The RF channel emulator 112 provides the channel conditions to the UE module 130 and the BS module 132 for application to uplink and/or downlink transmissions.

In some embodiments, the switch module 125 analyzes the downlink data to determine an IP address associated with the UE module 130 to which the downlink data is to be transmitted. For example, the switch module 125 may analyze the downlink data to determine an identifier associated with the UE module 130. The switch module 125 may access a data structure storing information associating identifiers with IP addresses to determine an IP address associated with the identifier. The switch module 125 may provide the downlink data to the UE module 130 based on the IP address.

In some embodiments, the UE emulator 134 of the UE module 130 receives the downlink data and/or the information from the channel conditions data structure 116 indicating the channel conditions. In some embodiments, the UE emulator 134 extracts the information identifying the channel conditions from the downlink channel and applies the channel conditions to the downlink data. The UE emulator 134 provides the downlink data to the UE MAC component 136 based on applying the channel conditions.

In some embodiments, the UE MAC component 136 schedules uplink data to be transmitted to the BS module 132 and may determine a modulation scheme (e.g., bipolar phase keying (BPSK), quadrature phase shift keying (QPSK), amplitude shift keying (ASK), frequency shift keying (FSK), and/or another suitable scheme) associated with transmitting data to the BS module 132 based on the channel conditions applied to the downlink data. In some embodiments, the UE emulator 134 transmits uplink data to the BS module 132 via the switch module 125 based on the schedule and/or the modulation scheme determined by the UE MAC component 136.

The switch module 125 receives the uplink data. In some embodiments, prior to the switch module 125 forwarding the uplink data to the BS module 132, the RF channel emulator 112 accesses the channel conditions data structure 116 to determine channel conditions associated with the uplink data based on a location of the UE 110 emulated by the UE module 130 relative to the base station 108 emulated by the BS module 132. The RF channel emulator 112 applies the channel conditions to the uplink data and/or may provide information indicating the channel conditions to the UE module 130 and the BS module 132.

In some embodiments, the switch module 125 analyzes the uplink data to determine an IP address associated with the BS module 132 to which the uplink data is to be transmitted. For example, the switch module 125 may analyze the uplink data to determine an identifier associated with the BS module 132. The switch module 125 may access a data structure storing information associating identifiers with IP addresses to determine an IP address associated with the identifier. The switch module 125 may provide the uplink data to the BS module 132 based on the IP address.

In some embodiments, the BS emulator receives the uplink data via the uplink channel. The BS MAC component 140 extracts channel condition information from the uplink data. The BS MAC component 140 determines channel conditions associated with the uplink channel based on the channel conditions. In some embodiments, the BS MAC component 140 allocates resources, such as PRBs, to the UE module 130 based on the channel conditions associated with the uplink channel. The BS MAC component 140 provides information identifying the allocated resources to the BS emulator 138. The BS emulator 138 transmits downlink data to the UE module 130. The downlink data includes information indicating the resources allocated to the UE module 130 to enable the UE module 130 to utilize the allocated resources to communicate via the wireless telecommunications network.

As indicated above, FIGS. 1A-1D are provided as one or more examples. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
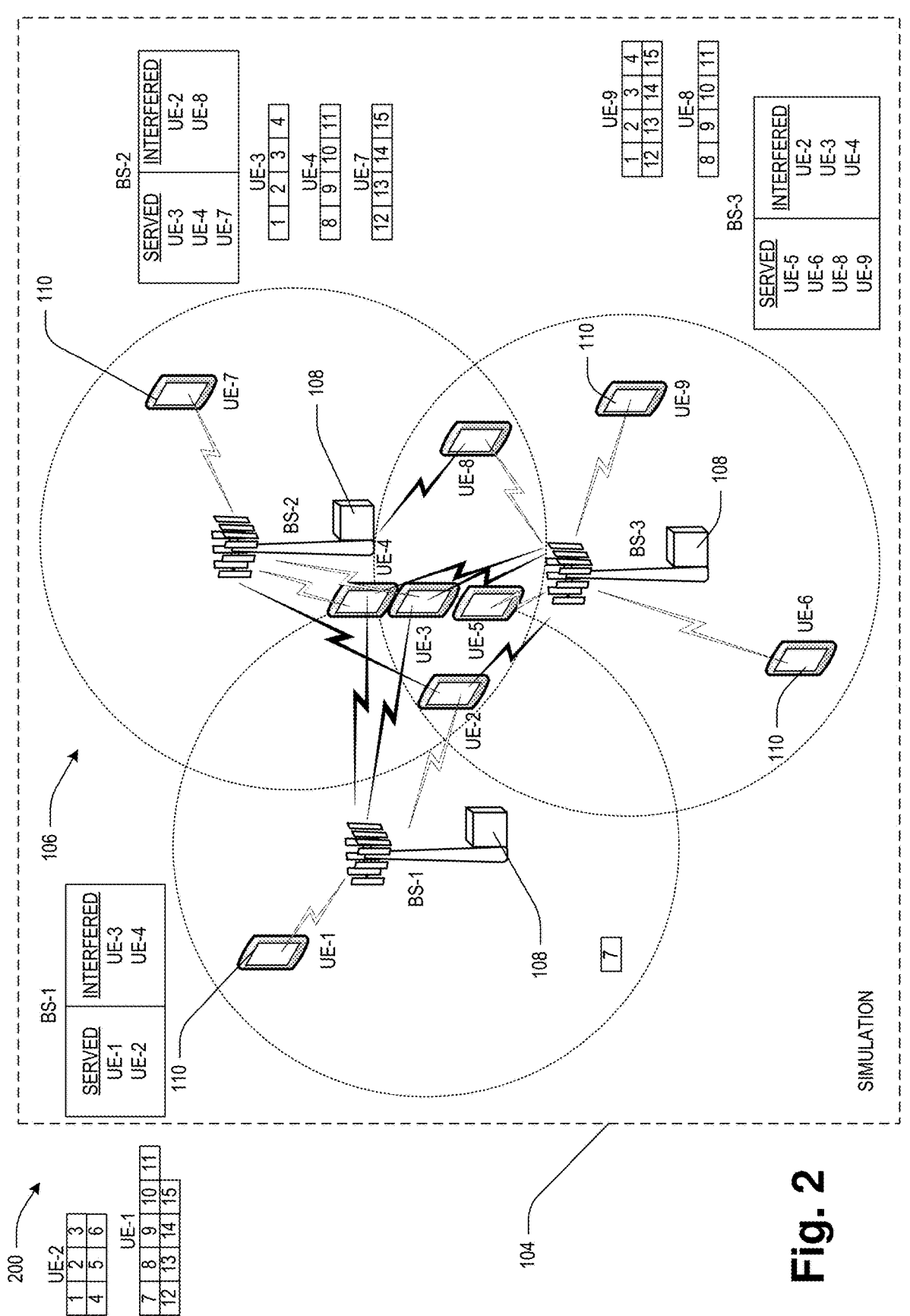
FIGS. 2 and 3, are diagrams of an example implementa-tions illustrating downlink communications and uplink com-munications, respectively, according to some embodiments.
Figure 3:
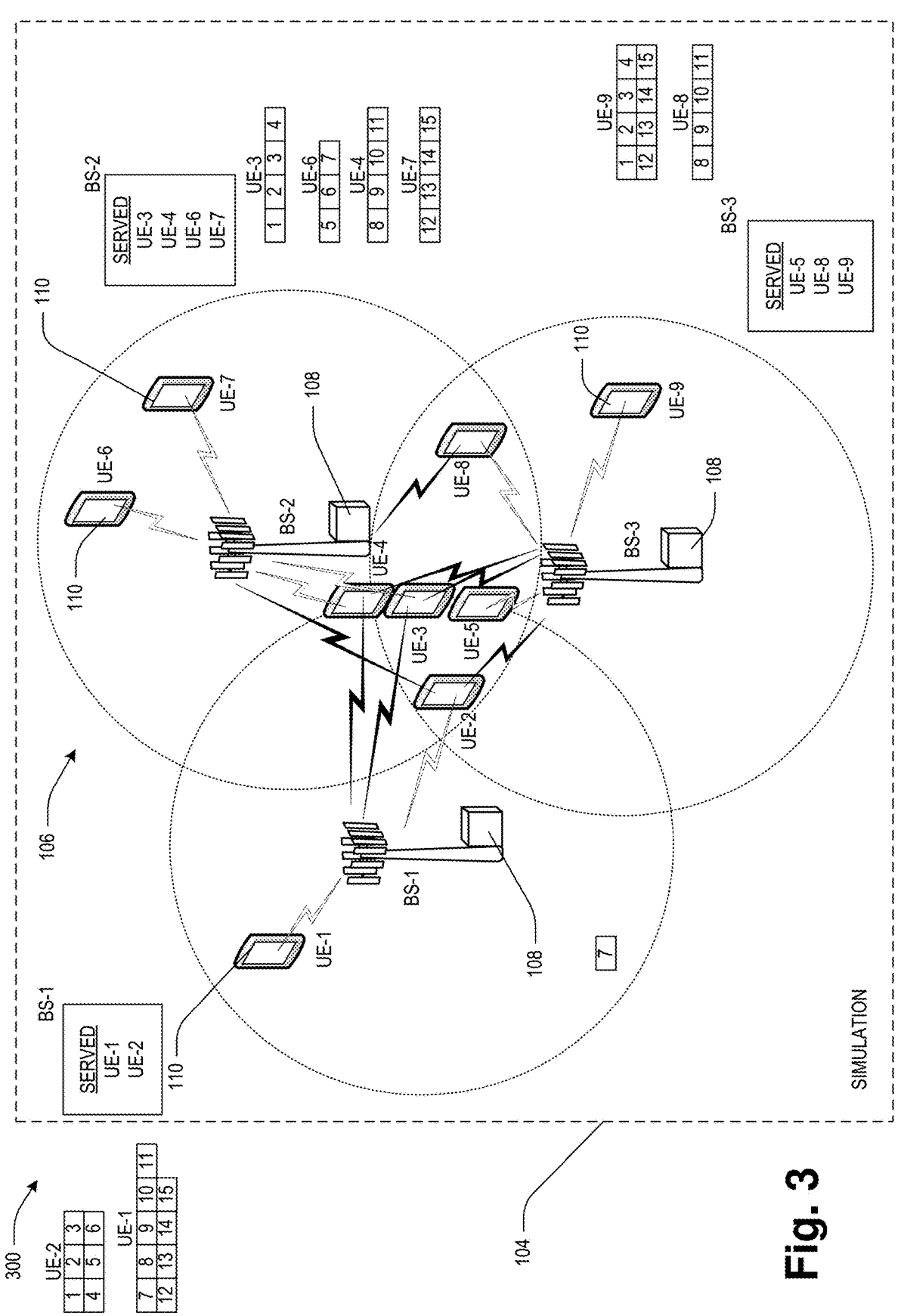

Referring to FIGS. 2 and 3, diagrams of an example implementations 200, 300 illustrating downlink communications and uplink communications, respectively, in the wireless telecommunications network 106 are provided, according to some embodiments. Interference from other UEs 110 or base stations 108 affects the channel conditions seen by a particular UE 110 or base station 108. In some embodiments, the UE module 130 calculates a SINR parameter for downlink communications and the BS module 132 calculates a SINR parameter for uplink communication.

For the downlink scenario in the implementation 200 of FIG. 2, each UE module 130 is aware of its serving base station 108. Each UE module 130 is aware of the neighboring cells and their associated base stations 108 that have overlapping coverage areas with its serving base station 108. A UE module 130 need not be aware of the locations of nearby UEs 110. A UE module 130 determines a downlink interference metric based on the neighboring base stations 108 that are transmitting using one or more of the PRBs that it has been assigned by its serving base station 108. Each base station 108 is aware of the UEs 110 it serves and assigns PRBs to the assigned UEs 110 for TTIs. The base station 108 is not aware of non-served UEs 110 that are interfered with by its transmissions. Each base station 108 communicates its assigned PRBs using a DCI message to its served UEs 110. Each BS module 132 generates a DL-RAM message that includes the DCI information for its base station 108 to facilitate sharing PRB assignments with neighboring BS modules 132.

In the example of FIG. 2, BS-1 serves UE-1 and UE-2, BS-2 serves UE-3, UE-4, and UE-7, and BS-3 serves UE-5, UE-6, UE-8, and UE-9, as indicated by the communication links filled with white. Interference is possible when a first base station 108 assigns PRBs to a first UE 110 that overlap PRBs assigned to a second UE 110 served by a second base station 108, and the first UE 110 is within the coverage area of the second base station 108. The UEs 110 served by a base station 108 and the potential interfering base stations 108 may vary over time UEs 110 change location. The example of FIG. 2 is associated with a single TTI at a given time, k.

As seen in FIG. 2, UE-1 is not susceptible to interference from BS-2 or BS-3. UE-2 is susceptible to interference from BS-2 and/or BS-3. UE-3 and UE-4 are susceptible to interference from BS-1 and/or BS-3. UE-5 is susceptible to interference from BS-1 and/or BS-2. UE-6 is not susceptible to interference from BS-1 or BS-3. UE-7 is not susceptible to interference from BS-1 or BS-2. UE-8 is susceptible to interference from BS-1 and/or BS-2. UE-9 is not susceptible to interference from BS-1 or BS-3.

FIG. 2 illustrates downlink PRB assignments for a particular TTI. In some embodiments, the base station 108 sends a DCI message to its served UEs 110 indicating the assigned PRBs. Note that not all UEs 110 are assigned PRBs in the particular TTI illustrated in FIG. 2. According to the assigned PRBs illustrated in FIG. 2, solid black communication links represent interference from non-serving base stations 108. For example, BS-1 assigns PRBs 1-6 to UE-2, and BS-2 assigns PRBs 1-4 to UE-3, giving rise to interference from BS-2 for UE-2 and interference from BS-1 for UE-3. BS-2 assigns PRBs 8-11 to UE-4, and BS-3 assigns PRBs 8-11 to UE-8, giving rise to interference from BS-3 for UE-4 and interference from BS-2 for UE-8. BS-1 assigns PRBs 1-6 to UE-2, and BS-3 assigns PRBs 1-4 to UE-9, giving rise to interference from BS-3 for UE-2. Since UE-9 is not within the coverage area of BS-1, interference is not generated from BS-1 for UE-9.

To facilitate computation of interference noise metrics, PRB assignments are exchanged between BS modules 132 and UE modules 130. Each base station 108 sends a DCI message to each of its served UEs 110 that assigns PRBs for one or more future TTIs. Based on the DCI information, each BS module 132 BS module 132 generates a DL-RAM message that lists the PRBs allocated for its served UEs 110. In some embodiments, the DL-RAM message comprises a bitmap in which PRBs are indexed in the order of increasing frequency starting with the lowest frequency employed in the carrier bandwidth spectrum. In some embodiments, the PRBs are mapped from the most significant bit (MSB) to the least significant bit (LSB). Unassigned or unused PRBs are set to "0" and assigned PRBs are set to "1". In some embodiments, the DL-RAM does not identify the served UE 110, but rather, only the assigned status of the PRBs used by the base station 108 for the TTI. In some embodiments, the DL-RAM messages exchanged between BS modules 132 include a cell ID field and a PRB bitmap field.

Each BS module 132 combines the DL-RAM messages received from neighboring BS module 132 to generate a combined DL-RAM message to send to the UE modules 130 of its served UEs 110 for the given TTI. In some embodiments, a BS module 132 only sends the combined DL-RAM message to the UE modules 130 of UEs 110 that are assigned PRBs for the given TTI, thereby reducing message overhead in the network analysis system 102. For example, the BS module 132 for BS-1 sends a combined DL-RAM message for BS-2 and BS-3 to the UE modules 130 for UE-1 and UE-2, the BS module 132 for BS-2 sends a combined DL-RAM message for BS-1 and BS-3 to the UE modules 130 for UE-3, UE-4, and UE-7, and the BS module 132 for BS-3 sends a combined DL-RAM message for BS-1 and BS-2 to the UE modules 130 for UE-8 and UE-9.

In some embodiments, the BS modules 132 identify UEs 110 that are not subject to interference and do not send the combined DL-RAM messages. For example, the BS module 132 for BS-1 identifies that UE-1 is not susceptible to interference based on the received DL-RAM messages and does not send the combined DL-RAM message to the UE modules 130 for UE-1. This approach further reduces overhead traffic.

In some embodiments, the combined DL-RAM message comprises a first field specifying a number of neighboring base stations 108 ranging from 0 to a maximum number of neighboring base stations, and for each neighboring base station 108, the base station ID field and the PRB bitmap field.

Upon receiving the DL-RAM messages, the UE module 130 calculates an interference metric for the TTI. In some embodiments, the interference metric comprises an SINR metric calculated by dividing the signal power from the serving base station 108 by the interference power associated with interfering base stations 108. The Interference power, $P_I$, is calculated using the equation:

$$P_I[\text{dBm}] = 10 * \log10\left\{\sum\nolimits^{BSj}\sum\nolimits^{PRB}\gamma^{BSj}_{PRBi}[lin] * P^{BSj,PRBi}_{Tx}[lin]\right\} +$$

$$G^{BSi}_a[\text{dB}] - L^{BSj}_p[\text{dB}] - L^{BSj}_{O2I}[\text{dB}] + G^{BSj}_{a,UE}[\text{dB}],$$

where $BS_j$ indicates a neighboring base station 108, $\gamma$ is a short-term fading parameter, $P_{Tx}$ indicates the transmit power of the neighboring base station 108, Ga indicates the antenna gain of the base station 108 or the UE 110, $L_p$ indicates the pass loss between the UE 110 and the neighboring base station 108, and $L_{O2I}$ indicates the outdoor-to-indoor (O2I) penetration loss. In some embodiments, the losses and gains are retrieved from the channel conditions data structure 116. Prior to the switch module 125 forwarding the downlink data to a UE module 130, the RF channel emulator 112 may obtain channel conditions associated with the downlink data based on a location of the UE 110 emulated by the UE module 130 relative to the base station 108 emulated by the BS module 132. The RF channel emulator 112 provides the channel conditions to the UE module 130 and the BS module 132 for application to uplink and/or downlink transmissions.

In some embodiments, the UE module 130 applies the interference parameter to the received downlink transmission to simulate the effects of interfering base stations 108 on the signal it receives from its serving base station 108.

For the uplink scenario in the implementation 300 of FIG. 3, BS-1 serves UE-1 and UE-2, BS-2 serves UE-3, UE-4, UE-6, and UE-7, and BS-3 serves UE-5, UE-8, and UE-9, as indicated by the communication links filled with white. Interference is possible when a first base station 108 assigns PRBs to a first UE 110 that overlap PRBs assigned to a second UE 110 served by a second base station 108, and the first UE 110 is within the coverage area of the second base station 108. The UEs 110 served by a base station 108 and the potential interfering base stations 108 may vary over time UEs 110 change location. The example of FIG. 3 is associated with a single TTI at a given time, k.

As seen in FIG. 3, BS-1 is susceptible to interference from transmissions by UE-3, UE-4, and UE-5. BS-2 is susceptible to interference from transmissions by UE-2, UE-5 and UE-8. BS-3 is susceptible to interference from transmissions by UE-2-, UE-3, and UE-4.

FIG. 3 illustrates uplink PRB assignments for a particular TTI. In some embodiments, the base station 108 sends an uplink control information (UCI) message to its served UEs 110 indicating the assigned PRBs. Note that not all UEs 110 are assigned PRBs in the particular TTI illustrated in FIG. 3. According to the assigned PRBs illustrated in FIG. 3, solid black communication links represent interference from non-served UEs 110. For example, BS-1 assigns uplink PRBs 1-6 to UE-2, and BS-2 assigns uplink PRBs 1-5 to UE-3, giving rise to interference from UE-2 for BS-2 and interference from UE-3 for BS-1. BS-2 assigns PRBs 8-11 to UE-4, and BS-3 assigns PRBs 8-11 to UE-8, giving rise to interference from UE-4 for BS-3 and interference from UE-8 for BS-2. BS-1 assigns PRBs 1-6 to UE-2, and BS-3 assigns PRBs 1-4 to UE-9, giving rise to interference from UE-2 for BS-3. Since UE-9 is not within the coverage area of BS-1, interference is not generated for BS-1 by UE-9.

To facilitate computation of interference noise metrics, PRB assignments are exchanged between BS modules 132 and UE modules 130. Each base station 108 sends a UCI message to each of its served UEs 110 that assigns PRBs for one or more future TTIs. Based on the UCI information, each BS module 132 BS module 132 generates a UL-UERAM message that lists the uplink PRBs allocated for each of its served UEs 110. In some embodiments, the UL-UERAM message comprises a first field indicating the number of scheduled UEs 110 and data for each UE 110. In some embodiments, the UE data comprises a UE identifier field, a PRB bitmap, a base station count field indicating the number of base stations 108 in which the UE 110 has coverage, and for each base station, the UE data comprises a base station identifier field and a path loss parameter indicating the path loss between the UE 110 and the base station 108. In some embodiments, the BS module 132 retrieves the path loss parameters for each UE and the base stations 108 from the channel conditions data structure 116. Each BS module 132 sends the UL-UERAM message to neighboring BS modules 132. This approach reduces overhead traffic by combining UE data for all served UE 110 into a single UL_UERAM message for sharing by the base stations 108.

Upon receiving the UL-UERAM messages from its neighboring BS modules 132, the BS module 132 calculates an uplink interference metric for the TTI. In some embodiments, the uplink interference metric comprises. an SINR metric for each served UE 110 generated by dividing the signal power from the served UE 110 by the interference power associated with interfering UE 110. The Interference power, $P_I$, is calculated using the equation:

$$P_I[\text{dBm}] = 10*\log10\left\{\sum{}^{UEj}\sum{}^{RB}\gamma_{RBi}^{BS,UEj}[lin]*P_{Tx}^{UEj,RBi}[lin]\right\} +$$
$$G_a^{BSd,UEj}[\text{dB}] - L_p^{BS,UEj}[\text{dB}] - L_{O2I}^{BS,UEj}[\text{dB}] + G_{a,UE}^{BSd,UEj}[\text{dB}]$$

where $BS_j$ indicates a neighboring base station 108, $UE_j$ indicates neighboring UE 110, $\gamma$ is a short-term fading parameter, $P_{Tx}$ indicates the transmit power of the UE 110, Ga indicates the antenna gain of the base station 108 or the UE 110, $L_p$ indicates the path loss between the neighboring UE 110 and the base station 108, and $L_{O2I}$ indicates the outdoor-to-indoor (O2I) penetration loss. In some embodiments, the losses and gains not included in the UL-UERAM message are retrieved from the channel conditions data structure 116.

In some embodiments, the BS module 132 applies the interference metric to the received uplink transmission to simulate the effects of interfering UE 110 on the signal it receives from its served UE 110.

FIG. 4 is a flow chart illustrating an example method 400 for estimating interference in a wireless telecommunication network 106, according to some embodiments. At 402 A first user equipment (UE) module 130 is instantiated on a first computing device. At 404, a second UE module 130 is instantiated on a second computing device connected to the first computing device by a wired network. At 406, a first base station (BS) module 132 associated with the first UE module 130 is instantiated on a third computing device coupled to the wired network. At 408, a second BS module 132 associated with the second UE module 130 is instantiated on a fourth computing device coupled to the wired network. At 410 a first resource allocation map is sent from the first BS module 132 to the second BS module 132. At 412, an interference metric is generated based on the first resource allocation map. At 414, a data transmission between the second UE module 130 and the second BS module 132 is simulated based on the interference metric.

Figure 5:
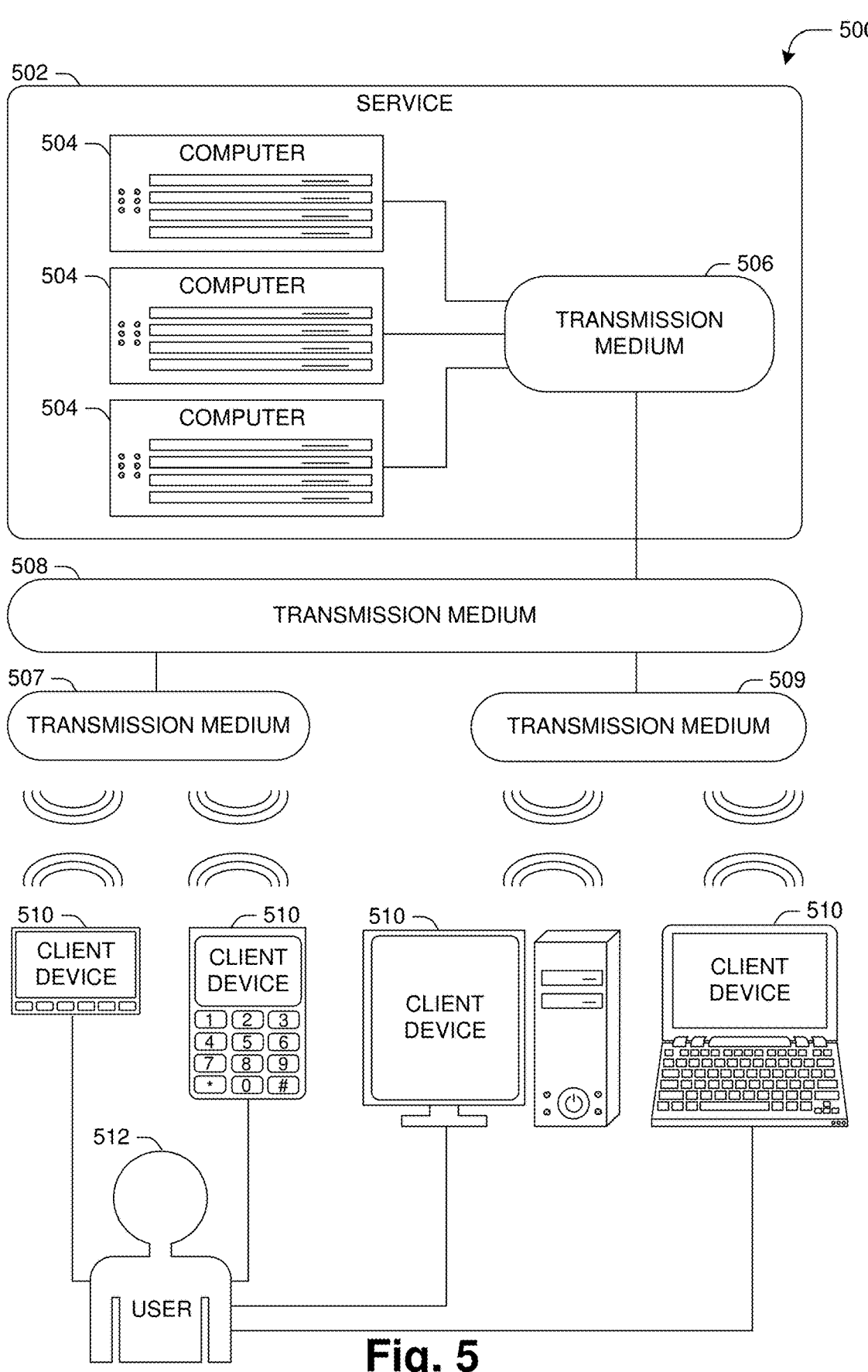
FIG. 5 is an illustration of a scenario involving various examples of transmission mediums that may be used to communicatively couple computers and clients.

In some implementations, one or more process blocks of FIG. 4 may be performed by a device (e.g., network analysis system 102). In some implementations, one or more process blocks of FIG. 4 may be performed by another device or a group of devices separate from or including the device, such as a user equipment and/or the like. FIG. 5 is an interaction diagram of a scenario 500 illustrating a service 502 provided by a set of computers 504 to a set of client devices 510 via various types of transmission mediums. The computers 504 and/or client devices 510 may be capable of transmitting, receiving, processing, and/or storing many types of signals, such as in memory as physical memory states.

The computers 504 of the service 502 may be communicatively coupled together, such as for exchange of communications using a transmission medium 506. The transmission medium 506 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 502.

Likewise, the transmission medium 506 may comprise one or more sub-networks, such as may employ different architectures, may be compliant or compatible with differing protocols and/or may interoperate within the transmission medium 506. Additionally, various types of transmission medium 506 may be interconnected (e.g., a router may provide a link between otherwise separate and independent transmission medium 506).

In scenario 500 of FIG. 5, the transmission medium 506 of the service 502 is connected to a transmission medium 508 that allows the service 502 to exchange data with other services 502 and/or client devices 510. The transmission medium 508 may encompass various combinations of devices with varying levels of distribution and exposure, such as a public wide-area network and/or a private network (e.g., a virtual private network (VPN) of a distributed enterprise).

In the scenario 500 of FIG. 5, the service 502 may be accessed via the transmission medium 508 by a user 512 of one or more client devices 510, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 510 may communicate with the service 502 via various communicative couplings to the transmission medium 508. As a first such example, one or more client devices 510 may comprise a cellular communicator and may communicate with the service 502 by connecting to the transmission medium 508 via a transmission medium 507 provided by a cellular provider. As a second such example, one or more client devices 510 may communicate with the service 502 by connecting to the transmission medium 508 via a transmission medium 509 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the computers 504 and the client devices 510 may communicate over various types of transmission mediums.

Figures 6, 7:
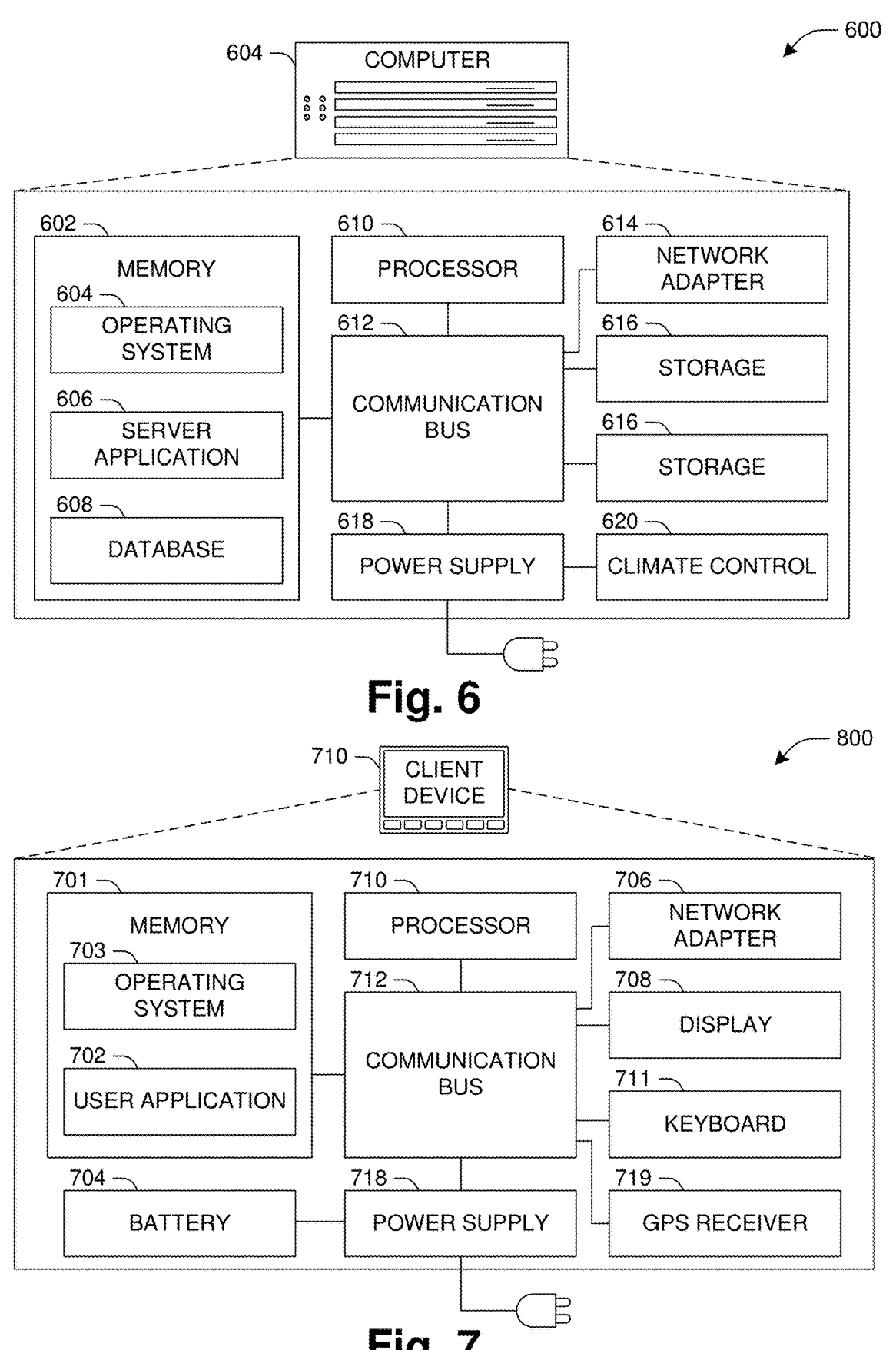
FIG. 6 is an illustration of a scenario involving an example configuration of a computer that may utilize and/or implement at least a portion of the techniques presented herein.
FIG. 7 is an illustration of a scenario involving an example configuration of a client that may utilize and/or implement at least a portion of the techniques presented herein.

FIG. 6 presents a schematic architecture diagram 600 of a computer 604 that may utilize at least a portion of the techniques provided herein. Such a computer 604 may vary widely in configuration or capabilities, alone or in conjunction with other computers, in order to provide a service such as the service 602.

The computer 604 may comprise one or more processors 610 that process instructions. The one or more processors 610 may optionally include a plurality of cores; one or more coprocessors, such as a mathematics coprocessor or an integrated graphical processing unit (GPU); and/or one or more layers of local cache memory. The computer 504 may comprise memory 602 storing various forms of applications, such as an operating system 604; one or more computer applications 606; and/or various forms of data, such as a database 608 or a file system. The computer 604 may comprise a variety of peripheral components, such as a wired and/or wireless network adapter 614 connectible to a local area network and/or wide area network; one or more storage components 616, such as a hard disk drive, a solid-state storage device (SSD), a flash memory device, and/or a magnetic and/or optical disk reader.

The computer 604 may comprise a mainboard featuring one or more communication buses 612 that interconnect the processor 610, the memory 602, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 612 may interconnect the computer 604 with at least one other computer. Other components that may optionally be included with the computer 604 (though not shown in the schematic architecture diagram 600 of FIG. 6) include a display; a display adapter, such as a graphical processing unit (GPU); input peripherals, such as a keyboard and/or mouse; and a flash memory device that may store a basic input/output system (BIOS) routine that facilitates booting the computer 604 to a state of readiness.

The computer 604 may operate in various physical enclosures, such as a desktop or tower, and/or may be integrated with a display as an "all-in-one" device. The computer 604 may be mounted horizontally and/or in a cabinet or rack, and/or may simply comprise an interconnected set of components. The computer 604 may comprise a dedicated and/or shared power supply 618 that supplies and/or regulates power for the other components. The computer 604 may provide power to and/or receive power from another computer and/or other devices. The computer 604 may comprise a shared and/or dedicated climate control unit 620 that regulates climate properties, such as temperature, humidity, and/or airflow. Many such computers 604 may be configured and/or adapted to utilize at least a portion of the techniques presented herein.

FIG. 7 presents a schematic architecture diagram 700 of a client device 610 whereupon at least a portion of the techniques presented herein may be implemented. Such a client device 610 may vary widely in configuration or capabilities, in order to provide a variety of functionality to a user such as the user 612. The client device 610 may be provided in a variety of form factors, such as a desktop or tower workstation; an "all-in-one" device integrated with a display 708; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 610 may serve the user in a variety of roles, such as a workstation, kiosk, media player, gaming device, and/or appliance.

The client device 610 may comprise one or more processors 710 that process instructions. The one or more processors 710 may optionally include a plurality of cores; one or more coprocessors, such as a mathematics coprocessor or an integrated graphical processing unit (GPU); and/or one or more layers of local cache memory. The client device 610 may comprise memory 701 storing various forms of applications, such as an operating system 703; one or more user applications 702, such as document applications, media applications, file and/or data access applications, communication applications such as web browsers and/or email clients, utilities, and/or games; and/or drivers for various peripherals. The client device 610 may comprise a variety of peripheral components, such as a wired and/or wireless network adapter 706 connectible to a local area network and/or wide area network; one or more output components, such as a display 708 coupled with a display adapter (optionally including a graphical processing unit (GPU)), a sound adapter coupled with a speaker, and/or a printer; input devices for receiving input from the user, such as a keyboard 711, a mouse, a microphone, a camera, and/or a touch-sensitive component of the display 708; and/or environmental sensors, such as a global positioning system (GPS) receiver 719 that detects the location, velocity, and/or acceleration of the client device 610, a compass, accelerometer, and/or gyroscope that detects a physical orientation of the client device 610. Other components that may optionally be included with the client device 610 (though not shown in the schematic architecture diagram 700 of FIG. 7) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 610 to a state of readiness; and a climate control unit that regulates climate properties, such as temperature, humidity, and airflow.

The client device 610 may comprise a mainboard featuring one or more communication buses 712 that interconnect the processor 710, the memory 701, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 610 may comprise a dedicated and/or shared power supply 718 that supplies and/or regulates power for other components, and/or a battery 704 that stores power for use while the client device 610 is not connected to a power source via the power supply 718. The client device 610 may provide power to and/or receive power from other client devices.

Figure 8:
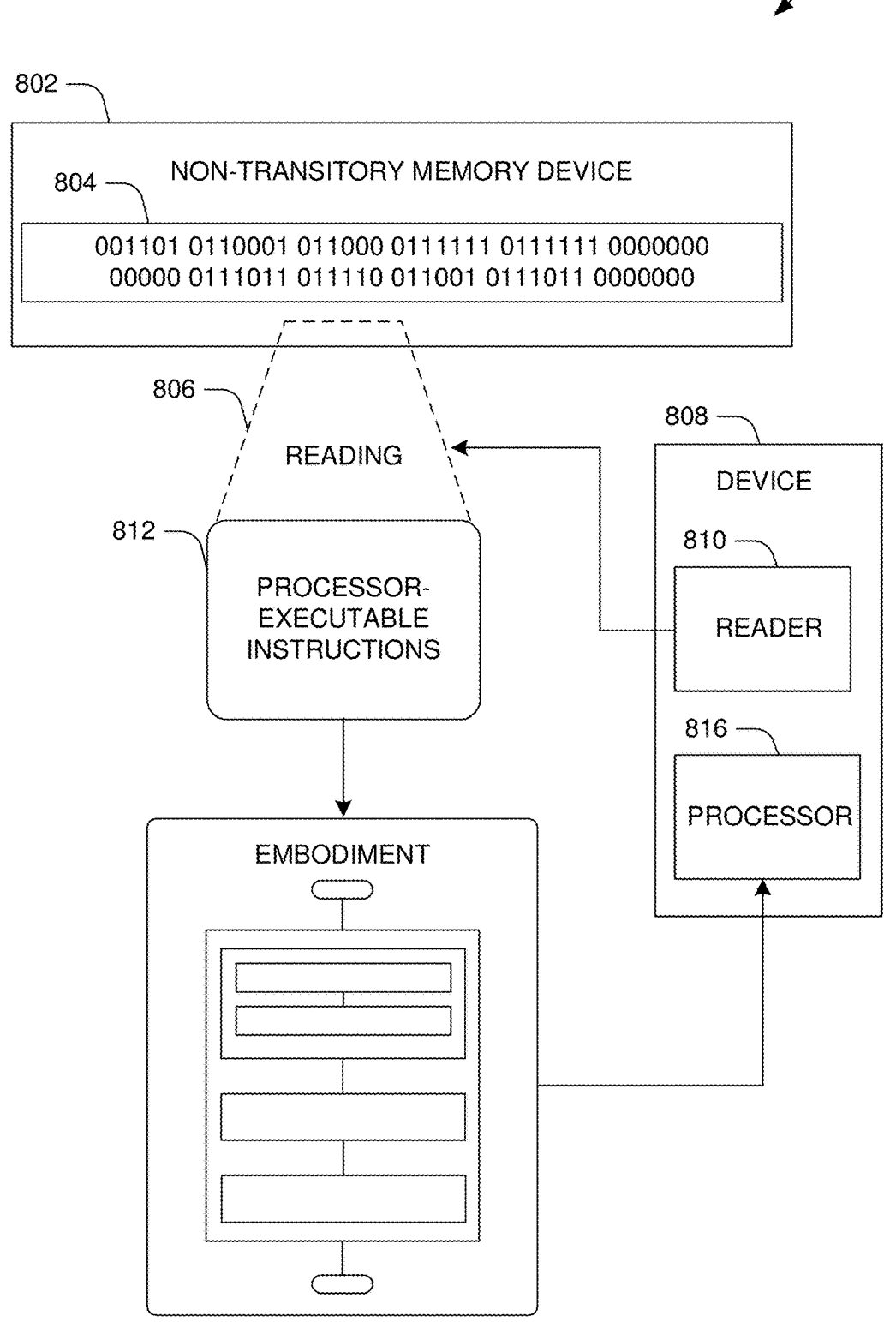
FIG. 8 is an illustration of a scenario featuring an example non-transitory machine readable medium in accordance with one or more of the provisions set forth herein.

FIG. 8 is an illustration of a scenario 800 involving an example non-transitory machine-readable medium 802. The non-transitory machine readable medium 802 may comprise processor-executable instructions 812 that when executed by a processor 816 cause performance (e.g., by the processor 816) of at least some of the provisions herein. The non-transitory machine readable medium 802 may comprise a memory semiconductor (e.g., a semiconductor utilizing static random access memory (SRAM), dynamic random access memory (DRAM), and/or synchronous dynamic random dom access memory (SDRAM) technologies), a platter of a hard disk drive, a flash memory device, or a magnetic or optical disc (such as a compact disk (CD), a digital versatile disk (DVD), or floppy disk). The example non-transitory machine-readable medium 802 stores machine-readable data 804 that, when subjected to reading 806 by a reader 810 of a device 808 (e.g., a read head of a hard disk drive, or a read operation invoked on a solid-state storage device), express the processor-executable instructions 812. In some embodiments, the processor-executable instructions 812, when executed cause performance of operations, such as at least some of the example method 400 of FIG. 4, for example. In some embodiments, the processor-executable instructions 812 are configured to cause implementation of a system.

Figure 9:
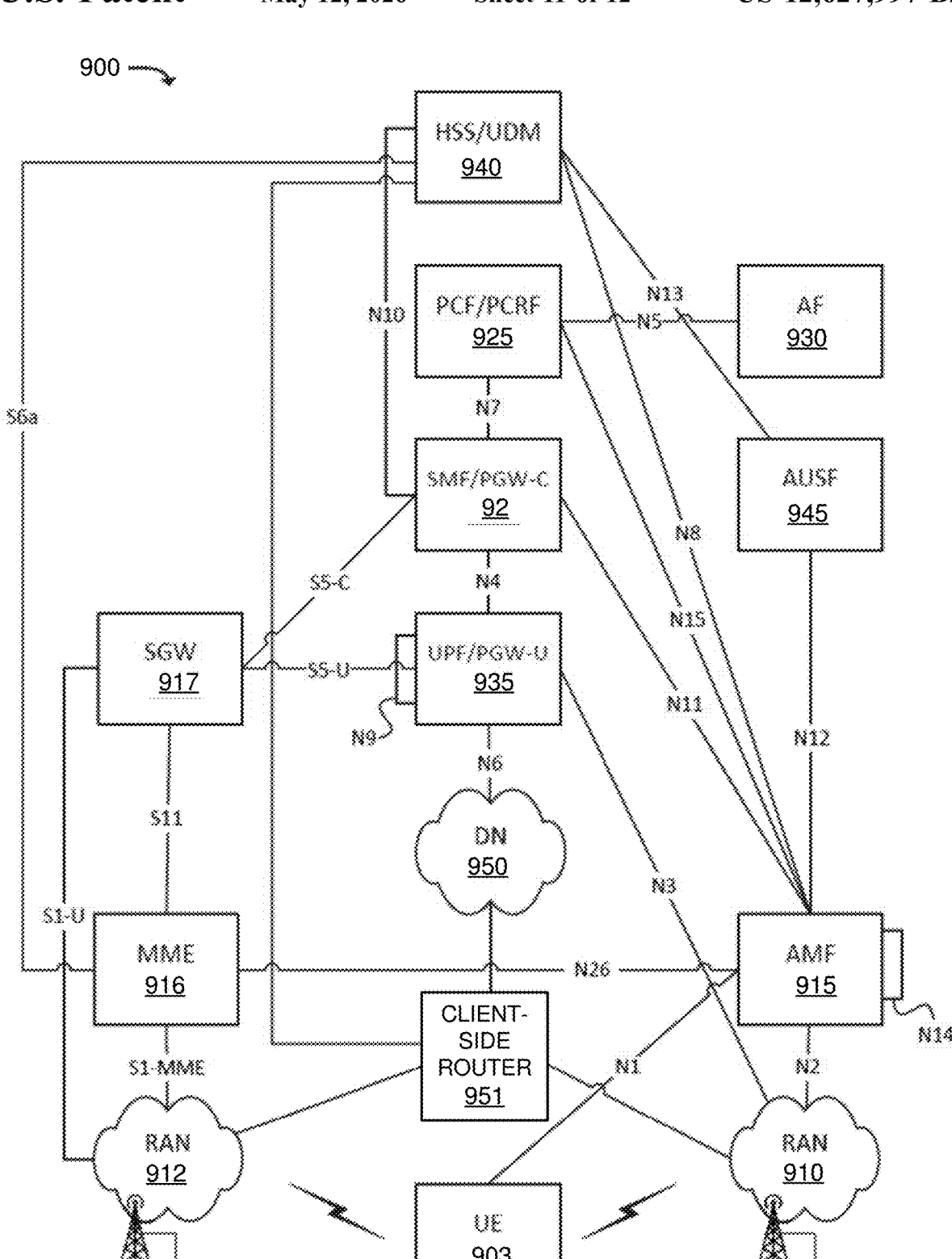
FIG. 9 is an illustration of an example environment in which at least a portion of the techniques presented herein may be utilized and/or implemented.

FIG. 9 illustrates an example environment 900, in which one or more embodiments may be implemented. In some embodiments, environment 900 may correspond to a Fifth Generation ("5G") network, and/or may include elements of a 5G network. In some embodiments, environment 900 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 900 may include UE 903, RAN 910 (which may include one or more Next Generation Node Bs ("gNBs") 911), RAN 912 (which may include one or more one or more evolved Node Bs ("eNBs") 913), and various network functions such as Access and Mobility Management Function ("AMF") 915, Mobility Management Entity ("MME") 916, Serving Gateway ("SGW") 917, Session Management Function ("SMF")/Packet Data Network ("PDN") Gateway ("PGW")-Control plane function ("PGW-C") 920, Policy Control Function ("PCF")/Policy Charging and Rules Function ("PCRF") 925, Application Function ("AF") 930, User Plane Function ("UPF")/PGW-User plane function ("PGW-U") 935, Home Subscriber Server ("HSS")/Unified Data Management ("UDM") 940, and Authentication Server Function ("AUSF") 945. Environment 900 may also include one or more networks, such as Data Network ("DN") 950. Environment 900 may include one or more additional devices or systems communicatively coupled to one or more networks (e.g., DN 950), such as client-side router 951.

The example shown in FIG. 9 illustrates one instance of each network component or function (e.g., one instance of SMF/PGW-C 920, PCF/PCRF 925, UPF/PGW-U 935, HSS/UDM 940, and/or 945). In practice, environment 900 may include multiple instances of such components or functions. For example, in some embodiments, environment 900 may include multiple "slices" of a core network, where each slice includes a discrete set of network functions (e.g., one slice may include a first instance of SMF/PGW-C 920, PCF/PCRF 925, UPF/PGW-U 935, HSS/UDM 940, and/or 945, while another slice may include a second instance of SMF/PGW-C 920, PCF/PCRF 925, UPF/PGW-U 935, HSS/UDM 940, and/or 945). The different slices may provide differentiated levels of service, such as service in accordance with different Quality of Service ("QoS") parameters.

The quantity of devices and/or networks, illustrated in FIG. 9, is provided for explanatory purposes only. In practice, environment 900 may include additional devices and/or networks, fewer devices and/or networks, different devices and/or networks, or differently arranged devices and/or networks than illustrated in FIG. 9. For example, while not shown, environment 900 may include devices that facilitate or enable communication between various components shown in environment 900, such as routers, modems, gateways, switches, hubs, etc. Alternatively and/or additionally, one or more of the devices of environment 900 may perform one or more network functions described as being performed by another one or more of the devices of environment 900. Devices of environment 900 may interconnect with each other and/or other devices via wired connections, wireless connections, or a combination of wired and wireless connections. In some implementations, one or more devices of environment 900 may be physically integrated in, and/or may be physically attached to, one or more other devices of environment 900.

UE 903 may include a computation and communication device, such as a wireless mobile communication device that is capable of communicating with RAN 911, RAN 912, and/or DN 950. UE 903 may be, or may include, a radio-telephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 903 may send traffic to and/or receive traffic (e.g., user plane traffic) from DN 950 via RAN 910, RAN 912, and/or UPF/PGW-U 935.

RAN 910 may be, or may include, a 5G RAN that includes one or more base stations (e.g., one or more gNBs 911), via which UE 903 may communicate with one or more other elements of environment 900. UE 903 may communicate with RAN 910 via an air interface (e.g., as provided by gNB 911). For instance, RAN 910 may receive traffic (e.g., voice call traffic, data traffic, messaging traffic, signaling traffic, etc.) from UE 903 via the air interface, and may communicate the traffic to UPF/PGW-U 935, and/or one or more other devices or networks. Similarly, RAN 910 may receive traffic intended for UE 903 (e.g., from UPF/PGW-U 935, AMF 915, and/or one or more other devices or networks) and may communicate the traffic to UE 903 via the air interface.

RAN 912 may be, or may include, a LTE RAN that includes one or more base stations (e.g., one or more eNBs 913), via which UE 903 may communicate with one or more other elements of environment 900. UE 903 may communicate with RAN 912 via an air interface (e.g., as provided by eNB 913). For instance, RAN 910 may receive traffic (e.g., voice call traffic, data traffic, messaging traffic, signaling traffic, etc.) from UE 903 via the air interface, and may communicate the traffic to UPF/PGW-U 935, and/or one or more other devices or networks. Similarly, RAN 910 may receive traffic intended for UE 903 (e.g., from UPF/PGW-U 935, SGW 917, and/or one or more other devices or networks) and may communicate the traffic to UE 903 via the air interface.

AMF 915 may include one or more devices, systems, Virtualized Network Functions ("VNFs"), etc., that perform operations to register UE 903 with the 5G network, to establish bearer channels associated with a session with UE 903, to hand off UE 903 from the 5G network to another network, to hand off UE 903 from the other network to the 5G network, manage mobility of UE 903 between RANs 910 and/or gNBs 911, and/or to perform other operations. In some embodiments, the 5G network may include multiple AMFs 915, which communicate with each other via the N14 interface (denoted in FIG. 9 by the line marked "N14" originating and terminating at AMF 915).

MME 916 may include one or more devices, systems, VNFs, etc., that perform operations to register UE 903 with the EPC, to establish bearer channels associated with a session with UE 903, to hand off UE 903 from the EPC to another network, to hand off UE 903 from another network to the EPC, manage mobility of UE 903 between RANs 912 and/or eNBs 913, and/or to perform other operations.

SGW 917 may include one or more devices, systems, VNFs, etc., that aggregate traffic received from one or more eNBs 913 and send the aggregated traffic to an external network or device via UPF/PGW-U 935. Additionally, SGW 917 may aggregate traffic received from one or more UPF/

PGW-Us 935 and may send the aggregated traffic to one or more eNBs 913. SGW 917 may operate as an anchor for the user plane during inter-eNB handovers and as an anchor for mobility between different telecommunication networks or RANs (e.g., RANs 910 and 912).

SMF/PGW-C 920 may include one or more devices, systems, VNFs, etc., that gather, process, store, and/or provide information in a manner described herein. SMF/PGW-C 920 may, for example, facilitate in the establishment of communication sessions on behalf of UE 903. In some embodiments, the establishment of communications sessions may be performed in accordance with one or more policies provided by PCF/PCRF 925.

PCF/PCRF 925 may include one or more devices, systems, VNFs, etc., that aggregate information to and from the 5G network and/or other sources. PCF/PCRF 925 may receive information regarding policies and/or subscriptions from one or more sources, such as subscriber databases and/or from one or more users (such as, for example, an administrator associated with PCF/PCRF 925).

AF 930 may include one or more devices, systems, VNFs, etc., that receive, store, and/or provide information that may be used in determining parameters (e.g., quality of service parameters, charging parameters, or the like) for certain applications.

UPF/PGW-U 935 may include one or more devices, systems, VNFs, etc., that receive, store, and/or provide data (e.g., user plane data). For example, UPF/PGW-U 935 may receive user plane data (e.g., voice call traffic, data traffic, etc.), destined for UE 903, from DN 950, and may forward the user plane data toward UE 903 (e.g., via RAN 910, SMF/PGW-C 920, and/or one or more other devices). In some embodiments, multiple UPFs 935 may be deployed (e.g., in different geographical locations), and the delivery of content to UE 903 may be coordinated via the N9 interface (e.g., as denoted in FIG. 9 by the line marked "N9" originating and terminating at UPF/PGW-U 935). Similarly, UPF/PGW-U 935 may receive traffic from UE 903 (e.g., via RAN 910, SMF/PGW-C 920, and/or one or more other devices), and may forward the traffic toward DN 950. In some embodiments, UPF/PGW-U 935 may communicate (e.g., via the N4 interface) with SMF/PGW-C 920, regarding user plane data processed by UPF/PGW-U 935.

HSS/UDM 940 and AUSF 945 may include one or more devices, systems, VNFs, etc., that manage, update, and/or store, in one or more memory devices associated with AUSF 945 and/or HSS/UDM 940, profile information associated with a subscriber. AUSF 945 and/or HSS/UDM 940 may perform authentication, authorization, and/or accounting operations associated with the subscriber and/or a communication session with UE 903.

DN 950 may include one or more wired and/or wireless networks. For example, DN 950 may include an Internet Protocol ("IP")-based PDN, a wide area network ("WAN") such as the Internet, a private enterprise network, and/or one or more other networks. UE 903 may communicate, through DN 950, with data servers, other UEs UE 903, and/or to other servers or applications that are coupled to DN 950. DN 950 may be connected to one or more other networks, such as a public switched telephone network ("PSTN"), a public land mobile network ("PLMN"), and/or another network. DN 950 may be connected to one or more devices, such as content providers, applications, web servers, and/or other devices, with which UE 903 may communicate.

The client-side router 951 may include one or more devices, systems, VNFs, etc., that perform one or more operations described herein. For example, the client-side router 951 may monitor and/or analyze video stream chunks and/or statuses associated with video stream chunks to check for quality issues and/or may deliver video stream chunks to UE 903.

FIG. 10 illustrates an example Distributed Unit ("DU") network 190, which may be included in and/or implemented by one or more RANs (e.g., RAN 910, RAN 912, or some other RAN). In some embodiments, a particular RAN may include one DU network 1000. In some embodiments, a particular RAN may include multiple DU networks 1000. In some embodiments, DU network 1000 may correspond to a particular gNB 911 of a 5G RAN (e.g., RAN 910). In some embodiments, DU network 1000 may correspond to multiple gNBs 911. In some embodiments, DU network 1000 may correspond to one or more other types of base stations of one or more other types of RANs. As shown, DU network 1000 may include Central Unit ("CU") 1005, one or more Distributed Units ("DUs") 1003-1 through 1003-N (referred to individually as "DU 1003," or collectively as "DUs 1003"), and one or more Radio Units ("RUs") 1001-1 through 1001-M (referred to individually as "RU 1001," or collectively as "RUs 1001").

CU 1005 may communicate with a core of a wireless network (e.g., may communicate with one or more of the devices or systems described above with respect to FIG. 10, such as AMF 1015 and/or UPF/PGW-U 1035). In the uplink direction (e.g., for traffic from UEs UE 1003 to a core network), CU 1005 may aggregate traffic from DUs 1003, and forward the aggregated traffic to the core network. In some embodiments, CU 1005 may receive traffic according to a given protocol (e.g., Radio Link Control ("RLC")) from DUs 1003, and may perform higher-layer processing (e.g., may aggregate/process RLC packets and generate Packet Data Convergence Protocol ("PDCP") packets based on the RLC packets) on the traffic received from DUs 1003.

In accordance with some embodiments, CU 1005 may receive downlink traffic (e.g., traffic from the core network) for a particular UE 1003, and may determine which DU(s) 1003 should receive the downlink traffic. DU 1003 may include one or more devices that transmit traffic between a core network (e.g., via CU 1005) and UE 1003 (e.g., via a respective RU 1001). DU 1003 may, for example, receive traffic from RU 1001 at a first layer (e.g., physical ("PHY") layer traffic, or lower PHY layer traffic), and may process/aggregate the traffic to a second layer (e.g., upper PHY and/or RLC). DU 1003 may receive traffic from CU 1005 at the second layer, may process the traffic to the first layer, and provide the processed traffic to a respective RU 1001 for transmission to UE 1003.

RU 1001 may include hardware circuitry (e.g., one or more RF transceivers, antennas, radios, and/or other suitable hardware) to communicate wirelessly (e.g., via an RF interface) with one or more UEs UE 1003, one or more other DUs 1003 (e.g., via RUs 1001 associated with DUs 1003), and/or any other suitable type of device. In the uplink direction, RU 1001 may receive traffic from UE 1003 and/or another DU 1003 via the RF interface and may provide the traffic to DU 1003. In the downlink direction, RU 1001 may receive traffic from DU 1003, and may provide the traffic to UE 1003 and/or another DU 1003.

RUs 1001 may, in some embodiments, be communicatively coupled to one or more Multi-Access/Mobile Edge Computing ("MEC") devices, referred to sometimes herein simply as ("MECs") 1007. For example, RU 1001-1 may be communicatively coupled to MEC 1007-1, RU 1001-M may be communicatively coupled to MEC 1007-M, DU 1003-1 may be communicatively coupled to MEC 1007-2, DU 1003-N may be communicatively coupled to MEC 1007-N, CU 1005 may be communicatively coupled to MEC 1007-3, and so on. MECs 1007 may include hardware resources (e.g., configurable or provisionable hardware resources) that may be configured to provide services and/or otherwise process traffic to and/or from UE 1003, via a respective RU 1001.

For example, RU 1001-1 may route some traffic, from UE 1003, to MEC 1007-1 instead of to a core network (e.g., via DU 1003 and CU 1005). MEC 1007-1 may process the traffic, perform one or more computations based on the received traffic, and may provide traffic to UE 1003 via RU 1001-1. In this manner, ultra-low latency services may be provided to UE 1003, as traffic does not need to traverse DU 1003, CU 1005, and an intervening backhaul network between DU network 1000 and the core network. In some embodiments, MEC 1007 may include, and/or may implement some or all of the functionality described above with respect to the client-side router 1051.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A system for simulating a telecommunications network, comprising:
 a first user equipment (UE) module and a second UE module;
 a first base station (BS) module associated with the first UE module; and
 a second BS module associated with the second UE module, wherein:
  one of the second UE module or the second BS module is configured to generate an interference metric and modulate a data transmission between the second UE module and the second BS module based on the interference metric.

2. The system of claim 1, wherein:
 the data transmission comprises a downlink data transmission from the second BS module to the second UE module; and
 the second UE module is configured to generate the interference metric based on a path loss parameter between the first BS module and the second UE module.

3. The system of claim 1, comprising:
 a third UE module, wherein:
  the first BS module is associated with the third UE module;

the first BS module is configured to send a first downlink control information (DCI) message to the first UE module and send a second DCI message to the third UE module; and the interference metric is based on a first resource allocation map generated based on the first DCI message and the second DCI message.

4. The system of claim 1, wherein:

the data transmission comprises an uplink data transmission from the second UE module to the second BS module; and the second BS module is configured to generate the interference metric based on a path loss parameter between the first UE module and the second BS module.

5. The system of claim 1, comprising:

a third UE module, wherein:

the first BS module is associated with the third UE module;

the first BS module is configured to send a first uplink control information (UCI) message to the first UE module and send a second UCI message to the third UE module; and the interference metric is based on a first resource allocation map generated based on the first UCI message and the second UCI message.

6. The system of claim 5, wherein:

the first resource allocation map comprises a first path loss parameter associated with the first UE module and the second BS module and a second path loss parameter associated with the third UE module and the second BS module.

7. The system of claim 1, comprising:

an RF channel emulator configured to generate a path loss parameter between the first BS module and the second UE module, wherein:

the one of the second UE module or the second BS module is configured to generate the interference metric based on a first resource allocation map and the path loss parameter.

8. The system of claim 1, wherein:

the first UE module comprises:

a UE emulator configured to simulate a physical layer (PHY) and a medium access control (MAC) module.

9. The system of claim 1, comprising:

a switch module having a first side coupled to the first UE module and the second UE module and a second side coupled to the first BS module and the second BS module.

10. A method comprising:

instantiating a first user equipment (UE) module on a first computing device coupled to a network, wherein the first UE module is associated with a first base station (BS) module on a second computing device coupled to the network;

instantiating a second UE module on a third computing device connected to the first computing device by the network, wherein the second UE module is associated with a second BS module on a fourth computing device coupled to the network;

generating an interference metric; and modulating a data transmission between the second UE module and the second BS module based on the interference metric.

11. The method of claim 10, comprising:

generating the interference metric by the second UE module based on a path loss parameter between the first BS module and the second UE module, wherein:

the data transmission comprises a downlink data transmission from the second BS module to the second UE module.

12. The method of claim 10, comprising:

instantiating a third UE module associated with the first BS module on a fifth computing device connected to the network;

sending a first downlink control information (DCI) message from the first BS module to the first UE module;

sending a second DCI message from the first BS module to the third UE module; and generating the interference metric based on the first DCI message and the second DCI message.

13. The method of claim 10, comprising:

generating the interference metric in the second BS module based on a path loss parameter between the first UE module and the second BS module, wherein:

the data transmission comprises an uplink data transmission from the second UE module to the second BS module.

14. The method of claim 10, comprising:

instantiating a third UE module associated with the first BS module on a fifth computing device connected to the network;

sending a first uplink control information (UCI) message from the first BS module to the first UE module;

sending a second UCI message from the first BS module to the third UE module; and generating the interference metric based on the first UCI message and the second UCI message.

15. The method of claim 14, wherein:

the interference metric is generated based on a first path loss parameter associated with the first UE module and the second BS module and a second path loss parameter associated with the third UE module and the second BS module.

16. The method of claim 10, comprising:

instantiating an RF channel emulator configured to generate a path loss parameter between the first BS module and the second UE module on a fifth computing device, wherein:

generating the interference metric comprises generating the interference metric based on the path loss parameter.

17. The method of claim 10, wherein:

the first UE module comprises:

a UE emulator configured to simulate a physical layer (PHY) and radio interface and a medium access control (MAC) module.

18. The method of claim 10, comprising:

instantiating a switch module having a first side coupled to the first UE module and the second UE module and a second side coupled to the first BS module and the second BS module on a fifth computing device.

19. A non-transitory computer-readable medium, storing instructions thereon that when executed by a processor cause the processor to:

generate an interference metric associated with a first user equipment (UE) module associated with a first base station (BS) module; and modulate a data transmission between a second UE module associated with a second BS module and the second BS module based on the interference metric.

20. The medium of claim 19, wherein:

the processor is to generate the interference metric in the second BS module based on a path loss parameter between the first UE module and the second BS module.

\* \* \* \* \*